(12) United States Patent
Furuya

(10) Patent No.: US 10,194,323 B2
(45) Date of Patent: Jan. 29, 2019

(54) WIRELESS BASE STATION, CORE NETWORK DEVICE, WIRELESS COMMUNICATION SYSTEM, AND WIRELESS COMMUNICATION METHOD

(71) Applicant: NEC Corporation, Tokyo (JP)

(72) Inventor: Tomoki Furuya, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/551,088

(22) PCT Filed: Jan. 19, 2016

(86) PCT No.: PCT/JP2016/000252
§ 371 (c)(1),
(2) Date: Aug. 15, 2017

(87) PCT Pub. No.: WO2016/139880
PCT Pub. Date: Sep. 9, 2016

(65) Prior Publication Data
US 2018/0027417 A1    Jan. 25, 2018

(30) Foreign Application Priority Data
Mar. 2, 2015 (JP) .................................. 2015-040244

(51) Int. Cl.
*H04W 52/34* (2009.01)
*H04W 16/08* (2009.01)
(Continued)

(52) U.S. Cl.
CPC ........... *H04W 16/08* (2013.01); *H04W 52/34* (2013.01); *H04W 52/343* (2013.01); *H04W 52/40* (2013.01); *H04W 76/30* (2018.02)

(58) Field of Classification Search
CPC ............................ H04W 52/60; H04W 52/34
(Continued)

(56) References Cited

U.S. PATENT DOCUMENTS

| | | | | |
|---|---|---|---|---|
| 9,723,565 | B2 * | 8/2017 | Nakano | H04W 52/04 |
| 2015/0079981 | A1 * | 3/2015 | Zhu | H04W 48/16 |
| | | | | 455/434 |
| 2016/0295424 | A1 * | 10/2016 | Lee | H04W 24/02 |

FOREIGN PATENT DOCUMENTS

| | | |
|---|---|---|
| JP | 2006-074683 A | 3/2006 |
| JP | 2007-518361 A | 7/2007 |

(Continued)

OTHER PUBLICATIONS

Communication dated Feb. 26, 2018 from the Russian Patent Office in counterpart Russian application No. 2017133675/07.

(Continued)

*Primary Examiner* — John J Lee
(74) *Attorney, Agent, or Firm* — Sughrue Mion, PLLC

(57) ABSTRACT

Provided is a wireless base station capable of increasing an area of overlap between a cell of the wireless base station and a cell of an adjacent wireless base station before the wireless base station narrows a cell range or reduces transmission power. A wireless base station (1-1) includes a communication unit (1A) and a control unit (1B) that transmits, to a wireless base station (1-2) adjacent to the wireless base station (1-1), through the communication unit (1A), an instruction signal that gives an instruction to expand a cell range of the wireless base station (1-2) in a direction of the wireless base station (1-1) before the wireless base station (1-1) narrows a cell range or reduces transmission power.

20 Claims, 11 Drawing Sheets

(51) Int. Cl.
*H04W 52/40* (2009.01)
*H04W 76/30* (2018.01)

(58) Field of Classification Search
USPC ............... 455/522, 69, 434, 446, 449, 436
See application file for complete search history.

(56) References Cited

FOREIGN PATENT DOCUMENTS

| | | |
|---|---|---|
| JP | 2010-004580 A | 1/2010 |
| JP | 2010-219970 A | 9/2010 |
| RU | 2013126620 A | 12/2014 |
| WO | 2010/098403 A1 | 9/2010 |
| WO | 2011/114372 A1 | 9/2011 |
| WO | 2014070778 A1 | 5/2014 |

OTHER PUBLICATIONS

International Search Report for PCT/JP2016/000252, dated Apr. 12, 2016.
Communication dated Oct. 9, 2018, issued by the Japan Patent Office in corresponding Japanese Application No. 2017-503331.

* cited by examiner

WIRELESS BASE STATION, CORE NETWORK DEVICE, WIRELESS COMMUNICATION SYSTEM, AND WIRELESS COMMUNICATION METHOD

CROSS REFERENCE TO RELATED APPLICATIONS

This application is a National Stage of International Application No. PCT/JP2016/00252 filed Jan. 19, 2016, claiming priority based on Japanese Patent Application No. 2015-040244 filed Mar. 2, 2015, the contents of all of which are incorporated herein by reference in their entirety.

TECHNICAL FIELD

The present invention relates to a wireless base station, a core network device, a wireless communication system, and a wireless communication method.

BACKGROUND ART

Wireless communication networks using wireless terminals and wireless base stations have become widespread, and communication services that allow a wireless terminal to perform wireless communication anytime, anywhere and with anyone are provided today. Further, because the contents of communication services evolve day by day, a wireless base station needs to update software according to need. At this time, the wireless base station carries out a reset. Further, in the event of a defect occurring while providing a communication service, the wireless base station carries out a reset in order to clear this condition in some cases. When the wireless base station carries out a reset, it narrows the cell range (a cell is the range reached a radio wave of the wireless base station) (or reduces the transmission power). In addition, the wireless base station narrows the cell range (or reduces the transmission power) in some cases, not limited to when carrying out a reset.

However, in the case where a wireless base station narrows the cell range (or reduces the transmission power), various problems can occur. For example, a call disconnection can occur in a wireless terminal that has made a call connection to a wireless base station that has narrowed the cell range (or reduced the transmission power). Therefore, a technique to avoid the occurrence of a call disconnection in the case of narrowing the cell range (or reducing the transmission power) has been proposed recently. For example, Patent Literatures 1 and 2 propose techniques to avoid the occurrence of a call disconnection in the case of reducing the transmission power for a software update.

According to the technique proposed in Patent Literature 1, a wireless base station gradually reduces the transmission power at the time of a software update, so that a wireless terminal that has made a call connection to the wireless base station is handed over to an adjacent wireless base station that is located adjacent to the wireless base station. It is thereby possible to avoid the occurrence of a call disconnection.

Further, according to the technique proposed in Patent Literature 2, a wireless base station reduces the transmission power and eliminates the overlap with the cell of an adjacent wireless base station, switches a communication channel during provision of a communication service to the adjacent wireless base station, and carries out a software update in this state. It is thereby also possible to avoid the occurrence of a call disconnection.

The techniques disclosed in Patent Literatures 1 and 2 are based on the assumption that the cell of a wireless base station that reduces the transmission power overlaps the cell of an adjacent wireless base station. In reality, however, the cell of a wireless base station includes an area that does not overlap the cell of an adjacent wireless base station. If the wireless base station reduces the transmission power in the circumstances where a wireless terminal is located in such an area, that wireless terminal cannot be handed over to the adjacent wireless base station, and thereby a call disconnection occurs. This issue is described hereinafter with reference to FIG. 1, using an example of an LTE (Long Term Evolution) wireless communication system which is widely used as the communication standard of a cell-phone unit.

The cell range of a wireless base station is generally several km, and the coverage area is limited with one wireless base station. Therefore, in an actual wireless communication network, a plurality of wireless base stations (which are eNBs (evolved NodeBs) in the case of the LTE) are placed as shown in FIG. 1 so as to expand the area where a wireless terminal can communicate.

In FIG. 1, seven eNBs (#1-#7) 10-1 to 10-7 are placed, and the eNBs (#2-#7) 10-2 to 10-7 are adjacent to the eNB (#1) 10-1. Cells of the eNBs (#1-#7) 10-1 to 10-7 are referred to as cells (#1-#7) 10-1a to 10-7a, respectively. Further, when a wireless terminal that has communicated with the eNB (#1) 10-1 in the area of the cell (#1) 10-1a moves to the area of the cell (#2) 10-2a, the wireless terminal switches the wireless base station with which it communicates from the eNB (#1) 10-1 to the eNB (#2) 10-2. This operation of switching is called a handover, and by carrying out a handover, the wireless terminal can continue communications without a call disconnection even when it moves to a different cell.

For example, it is assumed that the eNB (#1) 10-1 gradually reduces the transmission power. In this case, a wireless terminal that is located in the shaded area that overlaps the cells (#2-#7) 10-2a to 10-7a of the eNBs (#2-#7) 10-2 to 10-7 that are adjacent to the eNB (#1) 10-1 can be handed over to an eNB corresponding to the overlapping cell. However, a wireless terminal that is located in the blank area of the cell (#1) 10-1a cannot be handed over because a radio wave does not reach from any of the eNBs (#2-#7) 10-2 to 10-7, and a call disconnection occurs.

CITATION LIST

Patent Literature

PTL1: Japanese Unexamined Patent Application Publication No. 2006-074683
PTL2: Japanese Unexamined Patent Application Publication No. 2010-004580

SUMMARY OF INVENTION

Technical Problem

As described above, the techniques disclosed in Patent Literatures 1 and 2 have a problem that, in the area of the cell of a wireless base station that narrows the cell range (or reduces the transmission power) which does not overlap the cell of any adjacent wireless base station, the occurrence of a call disconnection of a wireless terminal that is located in the area is not avoidable.

It is considered that the above problem can be suppressed by increasing the area where the cell of a wireless base station and the cell of an adjacent wireless base station overlap before narrowing the cell range (or reducing the transmission power) of the wireless base station.

In view of the foregoing, one exemplary object of the present invention is to provide a wireless base station, a core network device, a wireless communication system, and a wireless communication method capable of increasing the area of overlap between the cell of a wireless base station and the cell of an adjacent wireless base station before narrowing the cell range (or reducing the transmission power) of the wireless base station.

Solution to Problem

In one exemplary aspect, a wireless base station includes a communication unit, and a control unit that transmits, to an adjacent wireless base station adjacent to the wireless base station, through the communication unit, an instruction signal that gives an instruction to expand a cell range of the adjacent wireless base station in a direction of the wireless base station before the wireless base station narrows a cell range or reduces transmission power.

In one exemplary aspect, a core network device includes a communication unit that receives, from a first wireless base station, a notification signal that gives a notification that the first wireless base station is to narrow a cell range or reduce transmission power, and a control unit that, when the notification signal is received from the first wireless base station, transmits, to a second wireless base station adjacent to the first wireless base station, through the communication unit, an instruction signal that gives an instruction to expand a cell range of the second wireless base station in a direction of the first wireless base station.

In one exemplary aspect, a wireless communication system includes a first wireless base station, and a second wireless base station adjacent to the first wireless base station. The first wireless base station transmits, to the second wireless base station, an instruction signal that gives an instruction to expand a cell range of the second wireless base station in a direction of the first wireless base station before the first wireless base station narrows a cell range or reduces transmission power.

In one exemplary aspect, a wireless communication system includes a first wireless base station, a second wireless base station adjacent to the first wireless base station, and a core network device. The first wireless base station transmits, to the core network device, a notification signal that gives a notification that the first wireless base station is to narrow a cell range or reduce transmission power before the first wireless base station narrows a cell range or reduces transmission power. When the notification signal is received from the first wireless base station, the core network device transmits, to the second wireless base station, an instruction signal that gives an instruction to expand a cell range of the second wireless base station in a direction of the first wireless base station.

In one exemplary aspect, a first wireless communication method is a wireless communication method by a wireless base station. The wireless communication method includes transmitting, to an adjacent wireless base station adjacent to the wireless base station, an instruction signal that gives an instruction to expand a cell range of the adjacent wireless base station in a direction of the wireless base station before the wireless base station narrows a cell range or reduces transmission power.

In one exemplary aspect, a second wireless communication method is a wireless communication method by a core network device. The wireless communication method includes receiving, from a first wireless base station, a notification signal that gives a notification that the first wireless base station is to narrow a cell range or reduce transmission power, and when the notification signal is received from the first wireless base station, transmitting, to a second wireless base station adjacent to the first wireless base station, an instruction signal that gives an instruction to expand a cell range of the second wireless base station in a direction of the first wireless base station.

Advantageous Effects of Invention

According to the exemplary aspects described above, it is possible to obtain the advantageous effect of increasing an area of overlap between a cell of a wireless base station and a cell of an adjacent wireless base station before narrowing the cell range or reducing the transmission power of the wireless base station.

DESCRIPTION OF EMBODIMENTS

Exemplary embodiments of the present invention are described hereinafter with reference to the drawings.

(1) First Exemplary Embodiment

Figure 2:
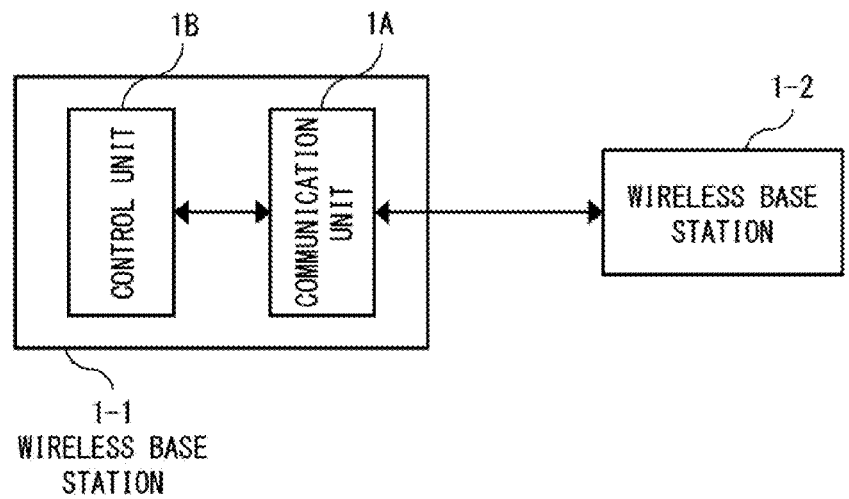
FIG. 2 is a view showing a configuration example of a wireless communication system according to a first exemplary embodiment.

FIG. 2 shows a configuration example of a wireless communication system according to this exemplary embodiment. The wireless communication system according to this exemplary embodiment includes a wireless base station (first wireless base station) 1-1 and a wireless base station (second wireless base station) 1-2, which is an adjacent wireless base station adjacent to the wireless base station 1-1. The wireless base station 1-1 includes a communication unit 1A and a control unit 1B. Because this exemplary embodiment is characterized by the configuration of the wireless base station 1-1, the description of the configuration of the wireless base station 1-2 is omitted.

The communication unit 1A is a part that communicates with the wireless base station 1-2. In the case where the wireless base station 1-1 narrows the cell range (or reduces the transmission power), the control unit 1B transmits, to the wireless base station 1-2 through the communication unit 1A, an instruction signal that gives an instruction to expand the cell range of the wireless base station 1-2 in the direction of the wireless base station 1-1 before narrowing the cell range (or reducing the transmission power). Note that the operation of narrowing the cell range (or reducing the transmission power) includes a reset operation. Further, the instruction signal may contain information that gives an instruction as to whether to use a directional antenna or a non-directional antenna. Further, the instruction signal may be a signal that gives an instruction to increase the transmission power of the wireless base station 1-2 or a signal that gives an instruction to change the direction of the directional antenna of the wireless base station 1-2 in the direction of the wireless base station 1-1.

As described above, in this exemplary embodiment, before narrowing the cell range (or reducing the transmission power), the wireless base station 1-1 transmits an instruction signal that gives an instruction to expand the cell range of the wireless base station 1-2 in the direction of the wireless base station 1-1 to the wireless base station 1-2 which is adjacent to the wireless base station 1-1. It is thereby possible to increase the area in which the cell of the wireless base station 1-1 and the cell of the wireless base station 1-2 overlap before the wireless base station 1-1 narrows the cell range (or reduces the transmission power).

(2) Second Exemplary Embodiment

Figure 3:
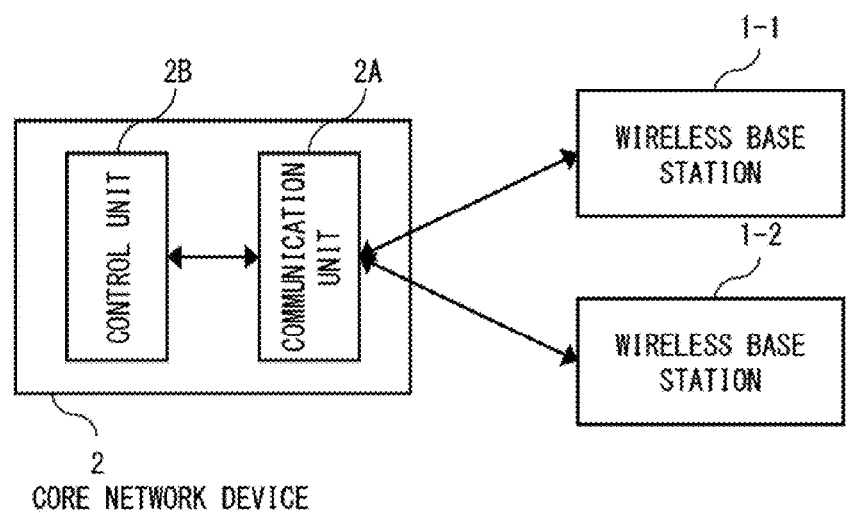
FIG. 3 is a view showing a configuration example of a wireless communication system according to a second exemplary embodiment.

FIG. 3 shows a configuration example of a wireless communication system according to this exemplary embodiment. The wireless communication system according to this exemplary embodiment includes a wireless base station (first wireless base station) 1-1, a wireless base station (second wireless base station) 1-2, which is an adjacent wireless base station adjacent to the wireless base station 1-1, and a core network device 2 that is placed in a core network. The core network device 2 includes a communication unit 2A and a control unit 2B. Because this exemplary embodiment is characterized by the configuration of the core network device 2, the description of the configuration of the wireless base stations 1-1 and 1-2 is omitted.

The communication unit 2A is a part that communicates with the wireless base stations 1-1 and 1-2. For example, the communication unit 2A receives a notification signal that gives a notification that the wireless base station 1-1 is to narrow the cell range (or reduce the transmission power) from the wireless base station 1-1. When the notification signal from the wireless base station 1-1 is received, the control unit 2B transmits an instruction signal that gives an instruction to expand the cell range of the wireless base station 1-2 in the direction of the wireless base station 1-1 to the wireless base station 1-2 which is adjacent to the wireless base station 1-1 through the communication unit 2A. Note that the instruction signal may contain information that gives an instruction as to whether to use a directional antenna or a non-directional antenna. Further, the instruction signal may be a signal that gives an instruction to increase the transmission power of the wireless base station 1-2 or a signal that gives an instruction to change the direction of the directional antenna of the wireless base station 1-2 in the direction of the wireless base station 1-1.

As described above, in this exemplary embodiment, when the core network device 2 receives the notification signal that gives a notification that the wireless base station 1-1 is to narrow the cell range (or reduce the transmission power) from the wireless base station 1-1, the core network device 2 transmits, to the wireless base station 1-2 which is adjacent to the wireless base station 1-1, an instruction signal that gives an instruction to expand the cell range of the wireless base station 1-2 in the direction of the wireless base station 1-1. It is thereby possible to increase the area in which the cell of the wireless base station 1-1 and the cell of the wireless base station 1-2 overlap before the wireless base station 1-1 narrows the cell range (or reduces the transmission power).

(3) Third Exemplary Embodiment

Figure 4:
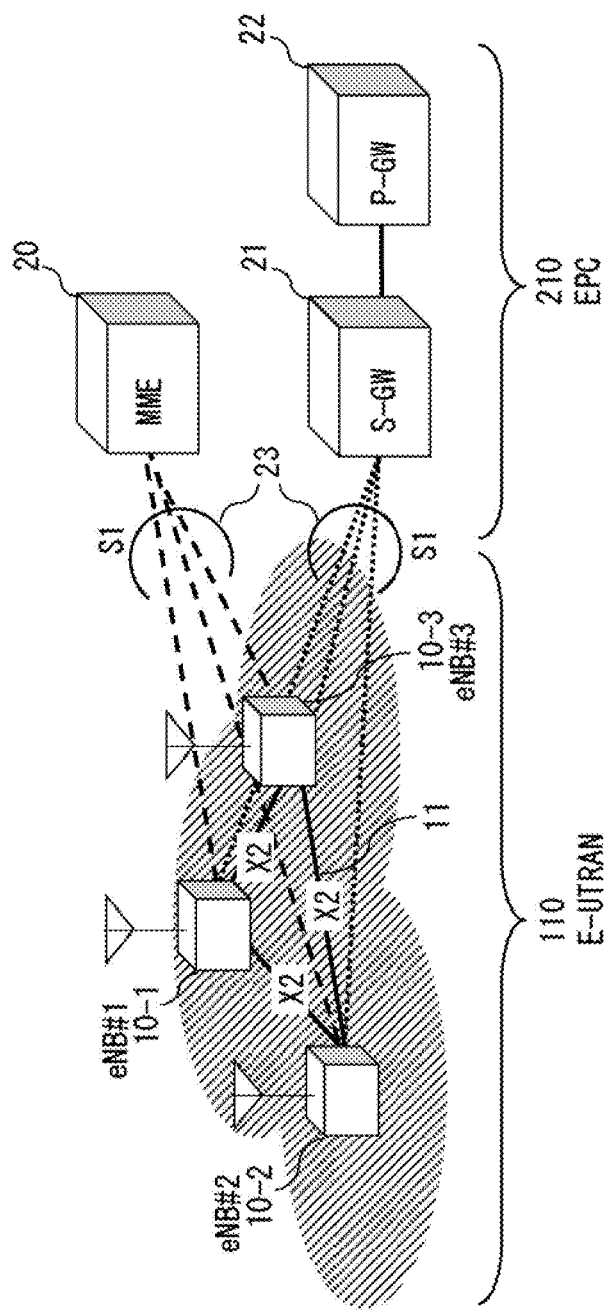
FIG. 4 is a view showing a configuration example of a wireless communication system according to third to sixth exemplary embodiments.

This exemplary embodiment is an example in which the wireless communication system according to the first exemplary embodiment is applied to an LTE wireless communication system. FIG. 4 shows a network configuration example of an LTE wireless communication system according to this exemplary embodiment. The LTE wireless communication system shown in FIG. 4 is composed of an E-UTRAN (Evolved Universal Terrestrial Radio Network) 110, which is a wireless network, and an EPC (Evolved Packet Core) 210, which is a core network. The EPC 210 includes an MME (Mobility Management Entity) 20 that handles the control plane for network control, a S-GW (Serving Gateway) 21 that handles the user plane for user data, and a P-GW (Packet data network Gateway) 22 for connection to an external network such as the Internet. Note that the MME 20 is an example of the core network device. Further, the E-UTRAN 110 includes a plurality of eNBs (#1-#3) 10-1 to 10-3. The plurality of eNBs (#1-#3) 10-1 to 10-3 are connected to one another through an X2 link 11, and also connected to the EPC 210 through an S1 link 23. Although only three eNBs (#1-#3) 10-1 to 10-3 are shown in FIG. 4, the E-UTRAN 110 includes at least seven eNBs (#1-#7) 10-1 to 10-7 shown in FIG. 1 in this exemplary embodiment. Further, the eNB (#1) 10-1 corresponds to the wireless base station 1-1 in FIG. 2, and the eNBs (#2-#7) 10-2 to 10-7 corresponds to the wireless base station 1-2 in FIG. 2.

Figure 5:
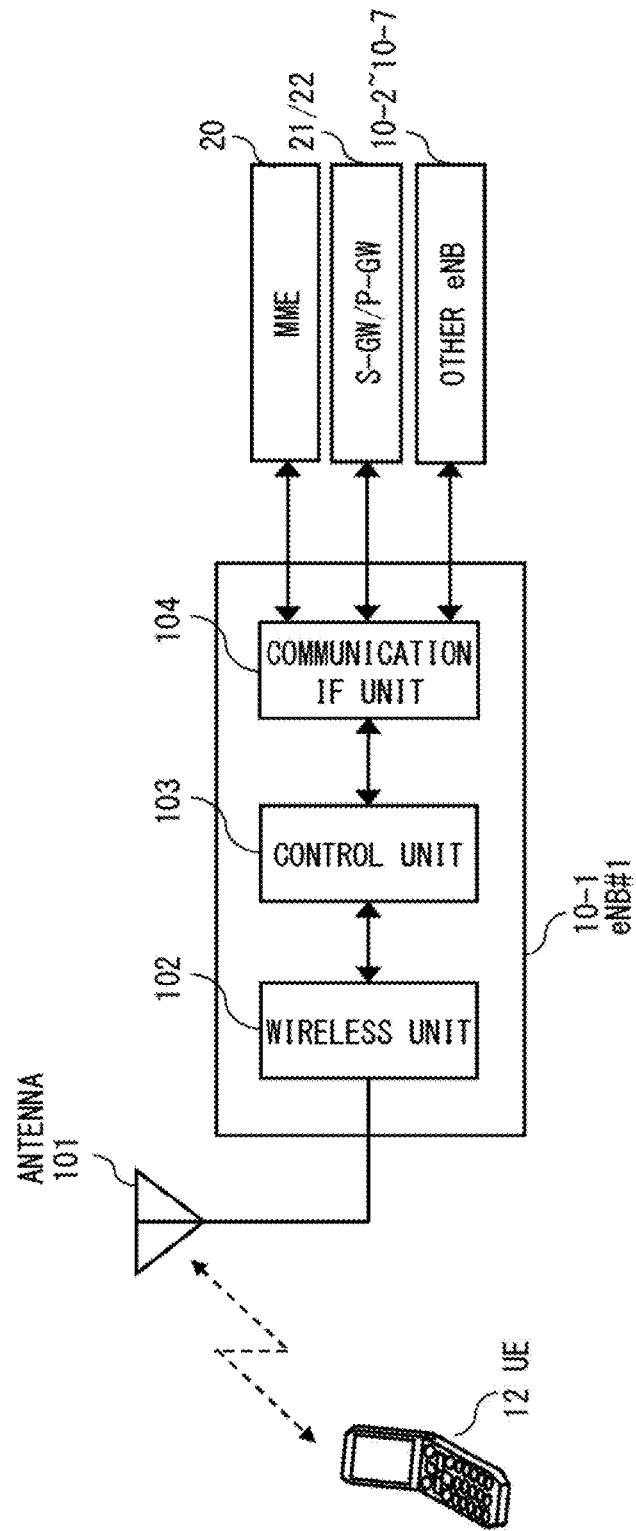
FIG. 5 is a view showing a configuration example of an eNB according to the third to sixth exemplary embodiments.

The configuration of the eNB (#1) 10-1 is described hereinafter. FIG. 5 shows a configuration example of the eNB (#1) 10-1. The eNB (#1) 10-1 shown in FIG. 5 include an antenna 101, a wireless unit 102, a control unit 103, and a communication IF (Interface) unit 104. The control unit 103 corresponds to the control unit 1B in FIG. 2, and the communication IF unit 104 corresponds to the communication unit 1A in FIG. 2. When the eNB (#1) 10-1 receives, by the antenna 101, a radio signal transmitted from a UE (User Equipment) 12, which is a wireless terminal such as a cell-phone unit, the eNB (#1) 10-1 converts the received radio signal into an electrical signal by the wireless unit 102. On the electrical signal converted by the wireless unit 102, processing for implementing various communication services is performed by the control unit 103. After that, data of the control plane for network control is transmitted to the MME 20 through the communication IF unit 104, and user data of the user plane is transmitted to the S-GW 21/P-GW 22 through the communication IF unit 104. Further, when transmitting a radio signal to the UE 12, the eNB (#1) 10-1 executes a process which is reverse of the above process. Further, when performing communications with the other eNBs (#2-#7) 10-2 to 10-7 by a handover operation or the like also, the eNB (#1) 10-1 performs communications through the communication IF unit 104. Note that, processing of the eNB (#1) 10-1 described hereinafter is performed by the control unit 103 unless otherwise specified. Further, the eNB (#1) 10-1 includes a memory, which is not shown, inside or outside the control unit 103. Information, which is described later, held in the eNB (#1) 10-1 is stored in this memory. Further, although the configuration of the eNB (#1) 10-1 is shown in FIG. 4, the other eNBs (#2-#7) 10-2 to 10-7 have the same configuration.

Note that, in this exemplary embodiment, the antenna 101 of the eNBs (#1-#7) 10-1 to 10-7 is a non-directional antenna.

Figure 6:
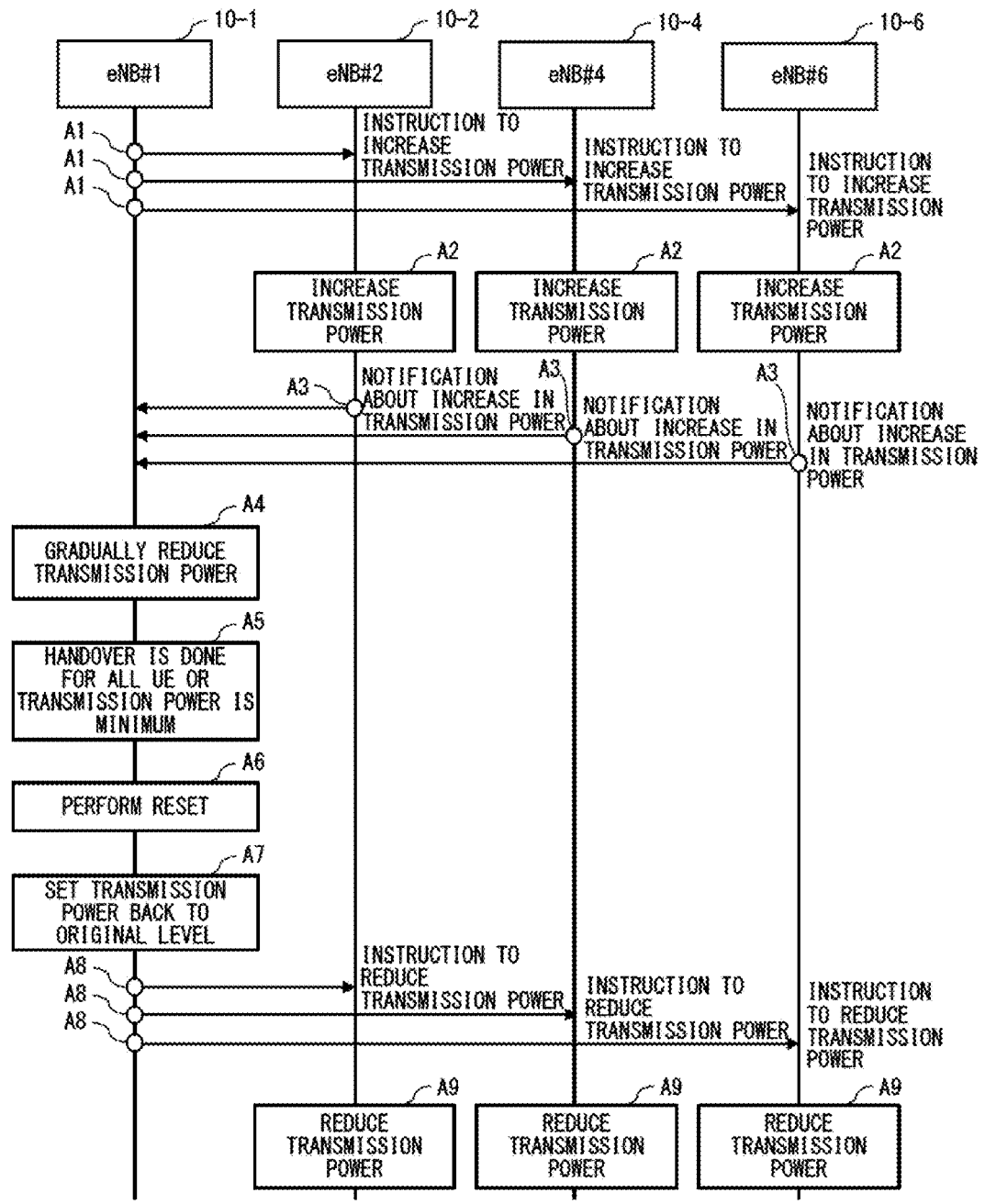
FIG. 6 is a sequence chart showing an operation example of the wireless communication system according to the third exemplary embodiment.

Hereinafter, the operation in the case where the eNB (#1) 10-1 narrows the cell range (or reduces the transmission power) for carrying out a reset in the wireless communication system according to this exemplary embodiment is described with reference to FIG. 6. It is assumed in this example that the cell arrangement of the eNBs (#1-#7) 10-1 to 10-7 before the eNB (#1) 10-1 narrows the cell range (or reduces the transmission power) is the cell arrangement shown in FIG. 1.

In the case where the eNB (#1) 10-1 narrows the cell range (or reduces the transmission power) for carrying out a reset, the control unit 103 of the eNB (#1) 10-1 transmits an instruction signal that gives an instruction to increase the transmission power to the eNBs (#2,#4,#6) 10-2, 10-4 and 10-6 which are adjacent to the eNB (#1) 10-1 through the communication IF unit 104 (Step A1). Note that, although the destination of the instruction signal in Step A1 is the adjacent three eNBs (#2,#4,#6) 10-2, 10-4 and 10-6 in this exemplary embodiment, it is not necessarily three eNBs, and it may be one eNB or all of the adjacent eNBs (#2-#7) 10-2 to 10-7. When selecting an arbitrary number or a specified number of (e.g., one or three) eNBs as the destination, the number of times each of the adjacent eNBs (#2-#7) 10-2 to 10-7 serves as the destination of a handover from the eNB (#1) 10-1 may be stored, and an arbitrary number or a specified number of eNBs may be selected sequentially in descending order of that number. Further, the instruction signal in Step A1 may be a signal that gives an instruction to maximize the transmission power value. Furthermore, the instruction signal in Step A1 may be a signal that indicates a specific transmission power value. As for the transmission power value in this case, a transmission power value that is required to overlap the cell of the eNB may be stored for each of the adjacent eNBs (#1-#7) 10-1 to 10-7 and used as the transmission power value. Further, the instruction signal in Step A1 may be contained in an X2 setup Request message, a HO (Handover) Request message or an eNB Reconfiguration Update message and transmitted, or may be contained in a new message and transmitted.

Figure 7:
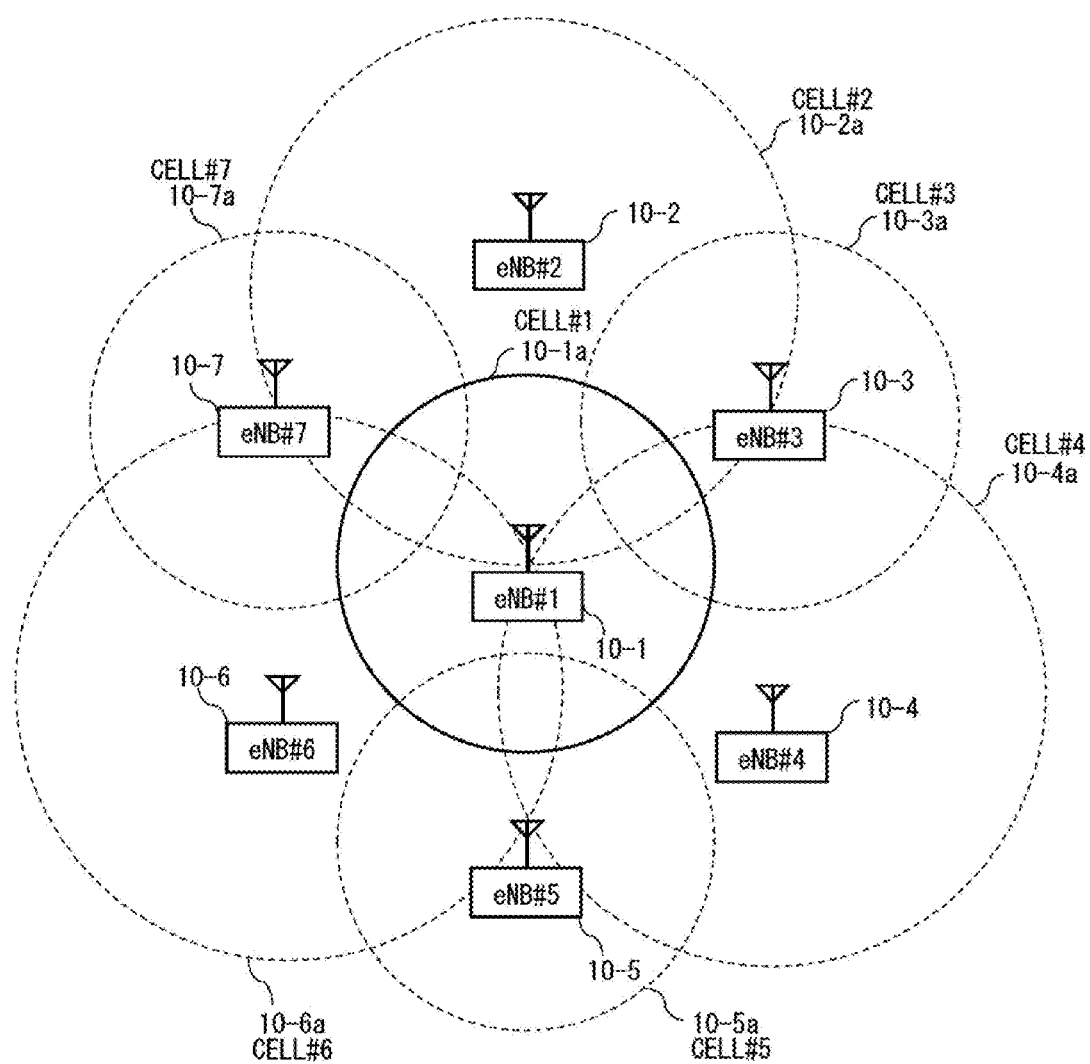
FIG. 7 is a view showing an example of cell arrangement changed by the wireless communication system according to the third and fourth exemplary embodiments.

In the eNBs (#2,#4,#6) 10-2, 10-4 and 10-6, the control unit 103 receives the instruction signal that gives an instruction to increase the transmission power from the eNB (#1) 10-1 through the communication IF unit 104. In the eNBs (#2,#4,#6) 10-2, 10-4 and 10-6, the control unit 103 that has received the instruction signal controls the wireless unit 102 and increases the transmission power of a radio signal that is transmitted from the antenna 101 (Step A2). By this operation, the cell ranges of the eNBs (#2,#4,#6) 10-2, 10-4 and 10-6 expand in all directions and completely overlap the cell of the eNB (#1) 10-1 as shown in FIG. 7. Note that, in this exemplary embodiment, it is just an example that the cell ranges of the eNBs (#2,#4,#6) 10-2, 10-4 and 10-6 completely overlap the cell of the eNB (#1) 10-1, and the cell ranges may only partially overlap it. Next, the control unit 103 of the eNBs (#2,#4,#6) 10-2, 10-4 and 10-6 transmits a notification signal that gives a notification that the transmission power has increased to the eNB (#1) 10-1 through the communication IF unit 104 (Step A3). Note that, in this exemplary embodiment, the notification signal in Step A3 may be contained in an X2 setup Response message, a HO Request Acknowledge message or an eNB Configuration Update Acknowledge message and transmitted, or may be contained in a new message and transmitted.

In the eNB (#1) 10-1, the control unit 103 receives the notification signal that gives a notification that the transmission power has increased from the eNBs (#2,#4,#6) 10-2, 10-4 and 10-6 through the communication IF unit 104. In the eNB (#1) 10-1, the control unit 103 that has received the notification signal controls the wireless unit 102 and gradually reduces the transmission power of a radio signal that is transmitted from the antenna 101 (Step A4). In the eNB (#1) 10-1, when all of the UEs 12 that have made a call connection are handed over to any one of the other eNBs (#2,#4,#6) 10-2, 10-4 and 10-6, or when the transmission power decreases to the minimum value (Step A5), the control unit 103 carries out a reset (Step A6). Note that, in this exemplary embodiment, it is just an example that all of the UEs 12 that have made a call connection are handed over, and Step A6 may be performed when only some of the UEs 12 are handed over. When a reset is completed (if it is a reset for software update, when software update after a reset is completed), the control unit 103 in the eNB (#1) 10-1 controls the wireless unit 102 and sets the transmission power of a radio signal that is transmitted from the antenna 101 back to the original level (Step A7). Then, the control unit 103 in the eNB (#1) 10-1 transmits an instruction signal that gives an instruction to reduce the transmission power (back to the original level) to the eNBs (#2,#4,#6) 10-2, 10-4 and 10-6 through the communication IF unit 104 (Step A8). Note that, in this exemplary embodiment, the instruction signal in Step A8 may be contained in the same messages as those used for the instruction signal in Step A1 and transmitted.

Figure 1:
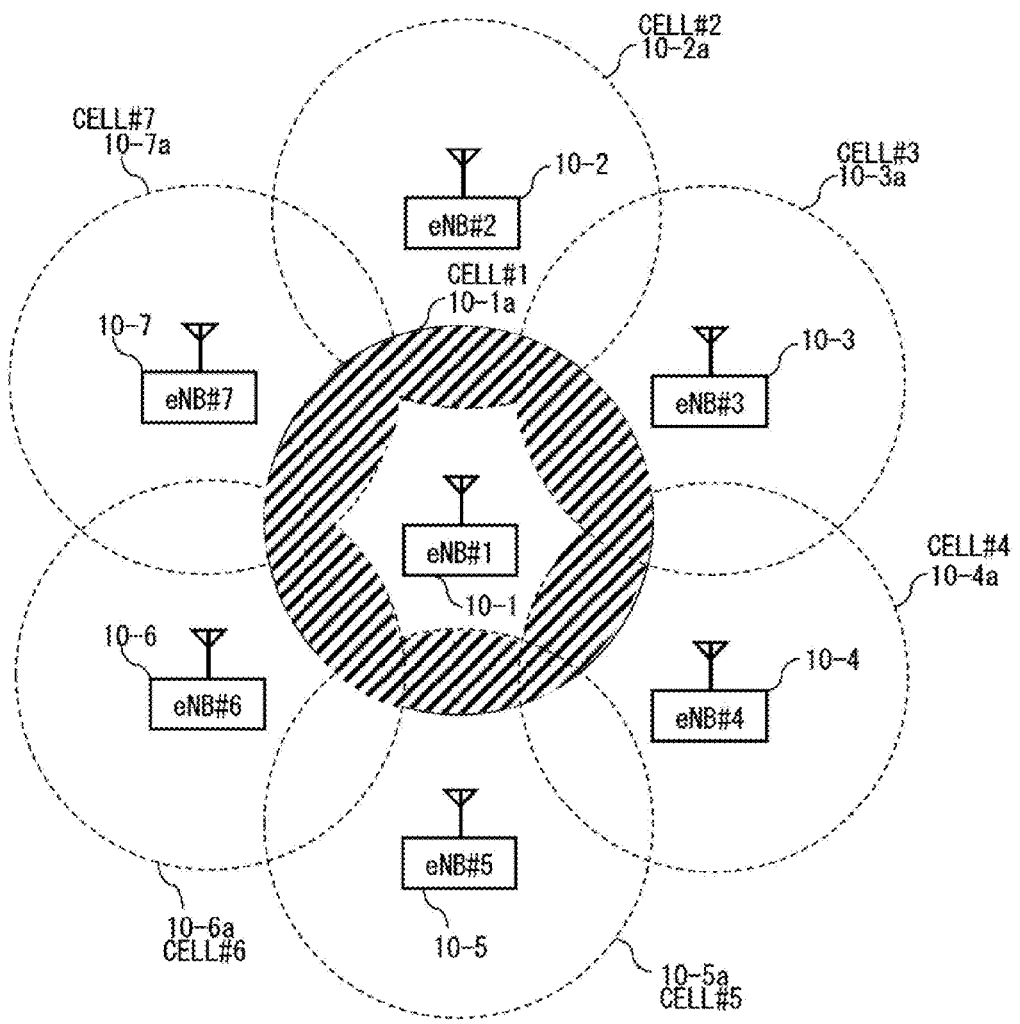
FIG. 1 is a view showing an example of cell arrangement in a wireless communication system.

In the eNBs (#2,#4,#6) 10-2, 10-4 and 10-6, the control unit 103 receives the instruction signal that gives an instruction to reduce the transmission power (back to the original level) from the eNB (#1) 10-1 through the communication IF unit 104. In the eNBs (#2,#4,#6) 10-2, 10-4 and 10-6, the control unit 103 that has received the instruction signal controls the wireless unit 102 and reduces the transmission power of a radio signal that is transmitted from the antenna 101 (back to the original level) (Step A9). By this operation, the cell ranges of the eNBs (#2,#4,#6) 10-2, 10-4 and 10-6 decrease, and it returns to the state where there are a part (shaded area) that overlaps the cell range of the eNB (#1) 10-1 and a part (blank area) that does not overlap it as shown in FIG. 1.

As described above, in this exemplary embodiment, the eNB (#1) 10-1 transmits an instruction signal that gives an instruction to increase the transmission power to the eNBs (#2,#4,#6) 10-2, 10-4 and 10-6 which are adjacent to the eNB (#1) 10-1 before narrowing the cell range (or reducing the transmission power). It is thereby possible to increase the area where the cell of the eNB (#1) 10-1 and the cells of the eNBs (#2,#4,#6) 10-2, 10-4 and 10-6 overlap before the eNB (#1) 10-1 narrows the cell range (or reduces the transmission power). This can reduces the UEs 12 that cannot be handed over to any of the eNBs (#2-#7) 10-2 to 10-7 when the eNB (#1) 10-1 reduces the transmission power for narrowing the cell range, and it is thus possible to suppress a problem that a call disconnection occurs in the UE 12.

Particularly, in the example of FIG. 7, the cells of the eNBs (#2,#4,#6) 10-2, 10-4 and 10-6 completely overlap the cell of the eNB (#1) 10-1, and it is possible to eliminate the area in the cell of the eNB (#1) 10-1 that does not overlap the cell of the adjacent eNB. As a result, a problem that the UE 12 cannot be handed over to the adjacent eNB and a call disconnection occurs.

Note that, in this exemplary embodiment, all of the eNBs (#2,#4,#6) 10-2, 10-4 and 10-6 that have received an instruction from the eNB (#1) 10-1 increase the transmission power in Steps A2 and A3. However, the eNBs (#2,#4,#6) 10-2, 10-4 and 10-6 may reject an instruction from the eNB (#1) 10-1 when the transmission power is already the maximum value or the like. When rejecting an instruction, a notification signal that notifies rejection is transmitted in Step A3. The notification signal in this case may be contained in an X2 setup Failure message or an eNB Configuration Update Failure message and transmitted, or may be contained in an information element related to rejection in a HO Request Acknowledge message and transmitted.

Further, in this exemplary embodiment, there is a case where the eNB (#1) 10-1 receives the above-described rejection in Step A3. Thus, it may have the following configuration. The eNB (#1) 10-1 starts up a timer at the time when it transmits the instruction signal in Step A1. Then, when the eNB (#1) 10-1 receives a notification signal that gives a notification that the transmission power has increased from at least one of the eNBs (#2,#4,#6) 10-2, 10-4 and 10-6 within an arbitrary time or a specified time, the process proceeds to Step A4, and otherwise, the process returns to Step A1 and transmits an instruction signal to another adjacent eNB.

Further, in this exemplary embodiment, the eNB (#1) 10-1 may have the following configuration in order not to receive the above-described rejection. The eNB (#1) 10-1 acquires and stores the current transmission power values of the eNBs (#2-#7) 10-2 to 10-7. Then, when selecting an arbitrary number or a specified number of (e.g., one or three) eNBs as the destination of the instruction signal in Step A1, the eNB (#1) 10-1 selects an arbitrary number or a specified number of eNBs sequentially in ascending order of the current transmission power value. Alternatively, the eNB (#1) 10-1 further stores the maximum transmission power values of the eNBs (#2-#7) 10-2 to 10-7 and selects an arbitrary number or a specified number of eNBs sequentially in descending order of the difference between the current transmission power value and the maximum transmission power value.

Further, in this exemplary embodiment, the eNB (#1) 10-1 may give an instruction to gradually increase the transmission power value in Step A1. At this time, the amount of increase in the transmission power value and the period of increasing the transmission power value may be set arbitrarily. Then, the eNB (#1) 10-1 measures the reception power of radio signals from the eNBs (#2,#4,#6) 10-2, 10-4 and 10-6 by a network listening function, and may determine that the cell overlaps when the reception power exceeds a threshold, and transmit an instruction signal that gives an instruction to stop increasing the transmission power value.

Further, in this exemplary embodiment, the eNB (#1) 10-1 may indicate the timing to increase the transmission power (a specific time, or after the lapse of an arbitrary time or a specified time etc.) by the instruction signal in Step A1.

(4) Fourth Exemplary Embodiment

This exemplary embodiment is an example in which the wireless communication system according to the second exemplary embodiment is applied to an LTE wireless communication system. Note that the network configuration of the LTE wireless communication system and the configuration of the eNBs (#1-#7) 10-1 to 10-7 in this exemplary embodiment are the same as those in the first exemplary embodiment. Further, the eNB (#1) 10-1 corresponds to the wireless base station 1-1 in FIG. 3, and the eNBs (#2-#7) 10-2 to 10-7 correspond to the wireless base station 1-2 in FIG. 3.

Figure 8:
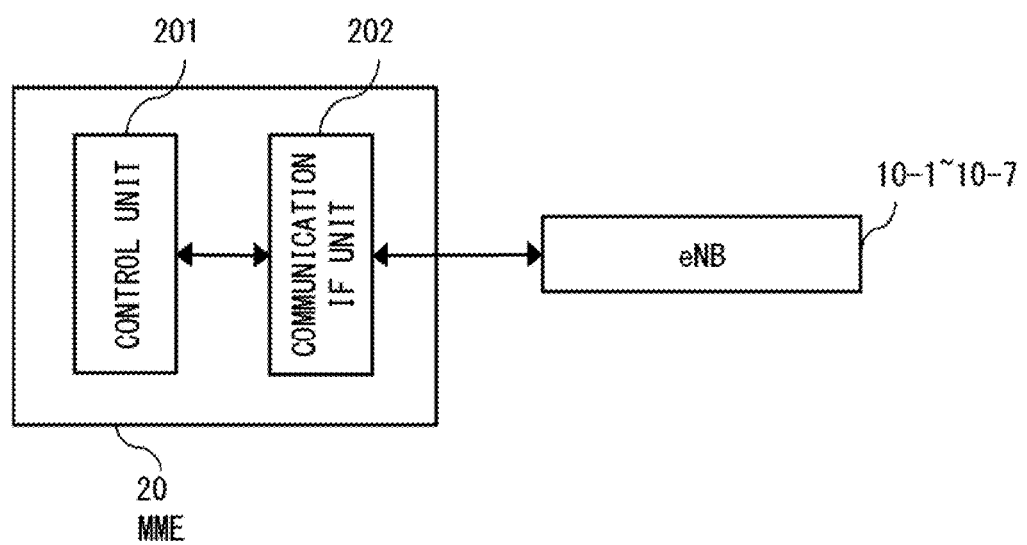
FIG. 8 is a view showing a configuration example of an MME according to the fourth and sixth exemplary embodiments.

The configuration of the MME 20 is described hereinafter. FIG. 8 shows a configuration example of the MME 20. The MME 20 shown in FIG. 8 includes a control unit 201 and a communication IF unit 202. Note that the control unit 201 corresponds to the control unit 2B in FIG. 3 and the communication IF unit 202 corresponds to the communication unit 2A in FIG. 3. When the MME 20 receives data of the control plane for network from the eNBs (#1-#7) 10-1 to 10-7 by the communication IF unit 104, it performs processing for network control by the control unit 201 based on the received data. Further, when the MME 20 transmits data to the eNBs (#1-#7) 10-1 to 10-7, it executes a process which is reverse of the above process. Note that, processing of the MME 20 described hereinafter is performed by the control unit 201 unless otherwise specified. Further, the MME 20 includes a memory, which is not shown, inside or outside the control unit 201. Information, which is described later, held in the MME 20 is stored in this memory.

Figure 9:
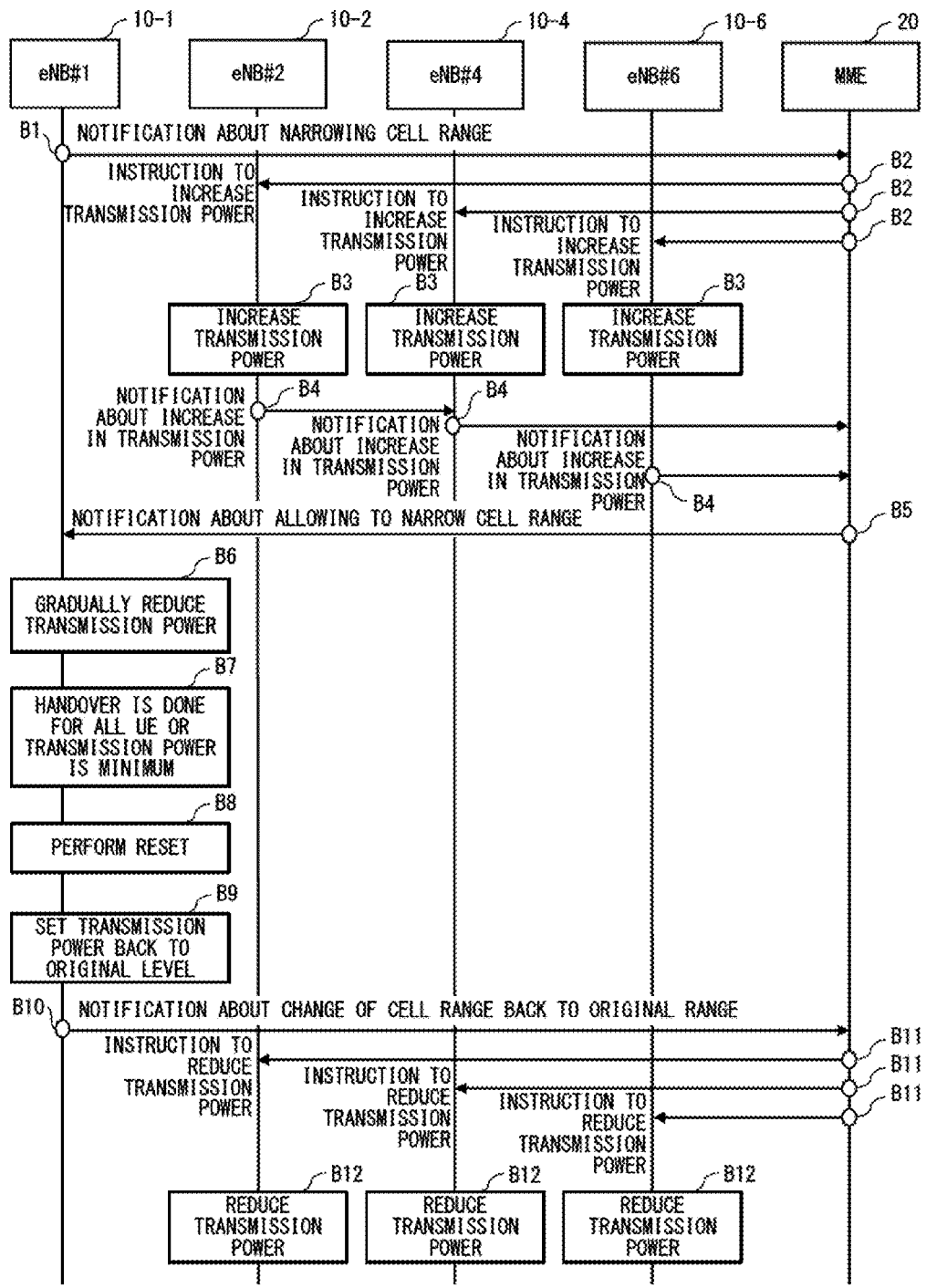
FIG. 9 is a sequence chart showing an operation example of the wireless communication system according to the fourth exemplary embodiment.

Hereinafter, the operation in the case where the eNB (#1) 10-1 narrows the cell range (or reduces the transmission power) for carrying out a reset in the wireless communication system according to this exemplary embodiment is described with reference to FIG. 9. It is assumed in this example that the cell arrangement of the eNBs (#1-#7) 10-1 to 10-7 before the eNB (#1) 10-1 narrows the cell range (or reduces the transmission power) is the cell arrangement shown in FIG. 1.

In the case where the eNB (#1) 10-1 narrows the cell range (or reduces the transmission power) for carrying out a reset, the control unit 103 of the eNB (#1) 10-1 transmits a notification signal that gives a notification about narrowing the cell range (or reducing the transmission power) to the MME 20 through the communication IF unit 104 (Step B1). Note that, in this embodiment, the notification signal in Step B1 may be contained in an MME Configuration Update message, an MME Direct Information Transfer message, or an MME Configuration Transfer message and transmitted, or may be contained in a new message and transmitted.

In the MME 20, the control unit 201 receives the notification signal that gives a notification of narrowing the cell range (or reducing the transmission power) from the eNB (#1) 10-1 through the communication IF unit 202. In the MME 20, the control unit 201 that has received the notification signal transmits an instruction signal that gives an instruction to increase the transmission power to the eNBs (#2,#4,#6) 10-2, 10-4 and 10-6 which are adjacent to the eNB (#1) 10-1 (Step B2). Note that, although the destination of the instruction signal in Step B2 is the three eNBs (#2,#4,#6) 10-2, 10-4 and 10-6 which are adjacent to the eNB (#1) 10-1 in this exemplary embodiment, it is not necessarily three eNBs, and it may be one eNB or all of the adjacent eNBs (#2-#7) 10-2 to 10-7. When selecting an arbitrary number or a specified number of (e.g., one or three) eNBs as the destination, the number of times each of the eNBs (#2-#7) 10-2 to 10-7 which are adjacent to the eNB (#1) 10-1 serves as the destination of a handover from the eNB (#1) 10-1 may be stored, and an arbitrary number or a specified number of eNBs may be selected sequentially in descending order of that number. Further, the instruction signal in Step B2 may be a signal that gives an instruction to maximize the transmission power value. Furthermore, the instruction signal in Step B2 may be a signal that indicates a specific transmission power value. As for the transmission power value in this case, a transmission power value that is required to overlap the cell of an eNB with the cell (#1) 10-1a of the eNB (#1) 10-1 may be stored for each of the eNBs (#2-#7) 10-2 to 10-7 which are adjacent to the eNB (#1) 10-1 and used as the transmission power value. Further, the instruction signal in Step B2 may be contained in an eNB Configuration Update message, an eNB Direct Information Transfer message or an eNB Configuration Transfer message and transmitted, or may be contained in a new message and transmitted.

In the eNBs (#2,#4,#6) 10-2, 10-4 and 10-6, the control unit 103 receives the instruction signal that gives an instruction to increase the transmission power from the MME 20 through the communication IF unit 104. In the eNBs (#2, #4,#6) 10-2, 10-4 and 10-6, the control unit 103 that has received the instruction signal controls the wireless unit 102 and increases the transmission power of a radio signal that is transmitted from the antenna 101 (Step B3). By this operation, the cell ranges of the eNBs (#2,#4,#6) 10-2, 10-4 and 10-6 expand in all directions and completely overlap the cell range of the eNB (#1) 10-1 as shown in FIG. 7. Note that, in this exemplary embodiment, it is just an example that the cell ranges of the eNBs (#2,#4,#6) 10-2, 10-4 and 10-6 completely overlap the cell of the eNB (#1) 10-1, and the cell ranges may only partially overlap it. Next, the control unit 103 of the eNBs (#2,#4,#6) 10-2, 10-4 and 10-6 transmits a notification signal that gives a notification that the transmission power has increased to the MME 20 through the communication IF unit 104 (Step B4). Note that, in this exemplary embodiment, the notification signal in Step B4 may be contained in the same messages as those used for the notification signal case of the notification signal in Step B1 and transmitted.

In the MME 20, the control unit 201 receives the notification signal that gives a notification that the transmission power has increased from the eNBs (#2,#4,#6) 10-2, 10-4 and 10-6 through the communication IF unit 202. In the MME 20, the control unit 201 that has received the notification signal gives a notification signal that gives a notification of allowing to narrow the cell range (or reduce the transmission power) to the eNB (#1) 10-1 through the communication IF unit 104 (Step B5). Note that, in this exemplary embodiment, the notification signal in Step B5 may be contained in the same messages as those used for the instruction signal in Step B2 and transmitted.

In the eNB (#1) 10-1, the control unit 103 receives the notification signal that gives a notification of allowing to narrow the cell range (or reduce the transmission power) from the MME 20 through the communication IF unit 104. In the eNB (#1) 10-1, the control unit 103 that has received the notification signal controls the wireless unit 102 and gradually reduces the transmission power of a radio signal that is transmitted from the antenna 101 (Step B6). In the eNB (#1) 10-1, when all of the UEs 12 that have made a call connection are handed over to any one of the other eNBs (#2,#4,#6) 10-2, 10-4 and 10-6, or when the transmission power decreases to the minimum value (Step B7), the control unit 103 carries out a reset (Step B8). Note that, in this exemplary embodiment, it is just an example that all of the UEs 12 that have made a call connection are handed over, and Step B8 may be performed when only some of the UEs 12 are handed over. When a reset is completed (if it is a reset for software update, when software update after a reset is completed), the control unit 103 in the eNB (#1) 10-1 controls the wireless unit 102 and sets the transmission power of a radio signal that is transmitted from the antenna 101 back to the original level (Step B9). Then, the control unit 103 in the eNB (#1) 10-1 transmits a notification signal that gives a notification that the cell range has returned to the original range (or the transmission power has returned to the original level) to the MME 20 through the communication IF unit 104 (Step B10). Note that, in this exemplary embodiment, the notification signal in Step B10 may be contained in the same messages as those used for the notification signal case of the notification signal in Step B1 and transmitted.

In the MME 20, the control unit 201 receives the notification signal that gives a notification that the cell range has returned to the original range (or the transmission power has returned to the original level) from the eNB (#1) 10-1 through the communication IF unit 202. In the MME 20, the control unit 201 that has received the notification signal transmits an instruction signal that gives an instruction to reduce the transmission power (back to the original level) to the eNBs (#2,#4,#6) 10-2, 10-4 and 10-6 (Step B1). Note that, in this exemplary embodiment, the instruction signal in Step B11 may be contained in the same messages as those used for the instruction signal in Step B2 and transmitted.

In the eNBs (#2,#4,#6) 10-2, 10-4 and 10-6, the control unit 103 receives the instruction signal that gives an instruction to reduce the transmission power (back to the original level) from the MME 20 through the communication IF unit 104. In the eNBs (#2,#4,#6) 10-2, 10-4 and 10-6, the control unit 103 that has received the instruction signal controls the wireless unit 102 and reduces the transmission power of a radio signal that is transmitted from the antenna 101 (back to the original level) (Step B12). By this operation, the cell ranges of the eNBs (#2,#4,#6) 10-2, 10-4 and 10-6 decrease, and it returns to the state where there are a part (shaded area) that overlaps the cell range of the eNB (#1) 10-1 and a part (blank area) that does not overlap it as shown in FIG. 1.

As described above, in this exemplary embodiment, the MME 20 transmits an instruction signal that gives an instruction to increase the transmission power to the eNBs (#2,#4,#6) 10-2, 10-4 and 10-6 which are adjacent to the eNB (#1) 10-1 before the eNB (#1) 10-1 narrows the cell range (or reduces the transmission power). It is thereby possible to increase the area where the cell of the eNB (#1) 10-1 and the cells of the eNBs (#2,#4,#6) 10-2, 10-4 and 10-6 overlap before the eNB (#1) 10-1 narrows the cell range (or reduces the transmission power). The other effects are the same as those of the third embodiment.

Note that, in this exemplary embodiment, just like in the third exemplary embodiment, the eNBs (#2,#4,#6) 10-2, 10-4 and 10-6 may reject an instruction to increase the transmission power from the MME 20 in Step B2.

Further, in this exemplary embodiment, because there is a case where the MME 20 receives the above-described rejection, it may have the following configuration, just like in the third exemplary embodiment. The MME 20 starts up a timer at the time when it transmits the instruction signal in Step B2. Then, when the MME 20 receives a notification signal that gives a notification that the transmission power has increased from at least one of the eNBs (#2,#4,#6) 10-2, 10-4 and 10-6 within an arbitrary time or a specified time, the process proceeds to Step B5, and otherwise, the process returns to Step B2 and transmits an instruction signal to another adjacent eNB.

Further, in this exemplary embodiment, the MME 20 may have the following configuration in order not to receive the above-described rejection, just like in the third exemplary embodiment. The MME 20 acquires and stores the current transmission power values of the eNBs (#2-#7) 10-2 to 10-7. Then, when selecting an arbitrary number or a specified number of (e.g., one or three) eNBs as the destination of the instruction signal in Step B2, the MME 20 selects, from the eNBs (#2-#7) 10-2 to 10-7, an arbitrary number or a specified number of eNBs sequentially in ascending order of the current transmission power value. Alternatively, the MME 20 further stores the maximum transmission power values of the eNBs (#1-#7) 10-1 to 10-7 and selects, from the eNBs (#2-#7) 10-2 to 10-7, an arbitrary number or a specified number of eNBs sequentially in descending order of the difference between the current transmission power value and the maximum transmission power value.

Further, in this exemplary embodiment, the MME 20 may give an instruction to gradually increase the transmission power in Step B2, just like in the third exemplary embodiment. At this time, the amount of increase in the transmission power value and the period of increasing the transmission power value may be set arbitrarily. Then, the eNB (#1) 10-1 measures the reception power of radio signals from the eNBs (#2,#4,#6) 10-2, 10-4 and 10-6 by a network listening function, and may determine that the cell overlaps when the reception power exceeds a threshold, and transmit a notification signal that gives a notification to the MME 20. Then, the MME 20 may transmit an instruction signal that gives an instruction to stop increasing the transmission power value to the eNBs (#2,#4,#6) 10-2, 10-4 and 10-6.

Further, in this exemplary embodiment, the MME 20 may indicate the timing to increase the transmission power (a specific time, or after the lapse of an arbitrary time or a specified time etc.) by the instruction signal in Step B2, just like in the third exemplary embodiment.

(5) Fifth Exemplary Embodiment

This exemplary embodiment is an example in which the wireless communication system according to the first exemplary embodiment is applied to an LTE wireless communication system, just like the third exemplary embodiment.

Note that, however, the transmission power of eNBs that are adjacent to the eNB (#1) 10-1 is increased in the third exemplary embodiment. On the other hand, in this exemplary embodiment, the direction of the directional antennas of eNBs that are adjacent to the eNB (#1) 10-1 is changed in the direction of the eNB (#1) 10-1. Thus, in this exemplary embodiment, the antennas 101 of the eNBs (#1-#7) 10-1 to 10-7 are directional antennas (in the following description of this exemplary embodiment, the antenna 101 is referred to as the directional antenna 101). The other configuration in this exemplary embodiment is the same as the configuration in the third exemplary embodiment.

Figure 10:
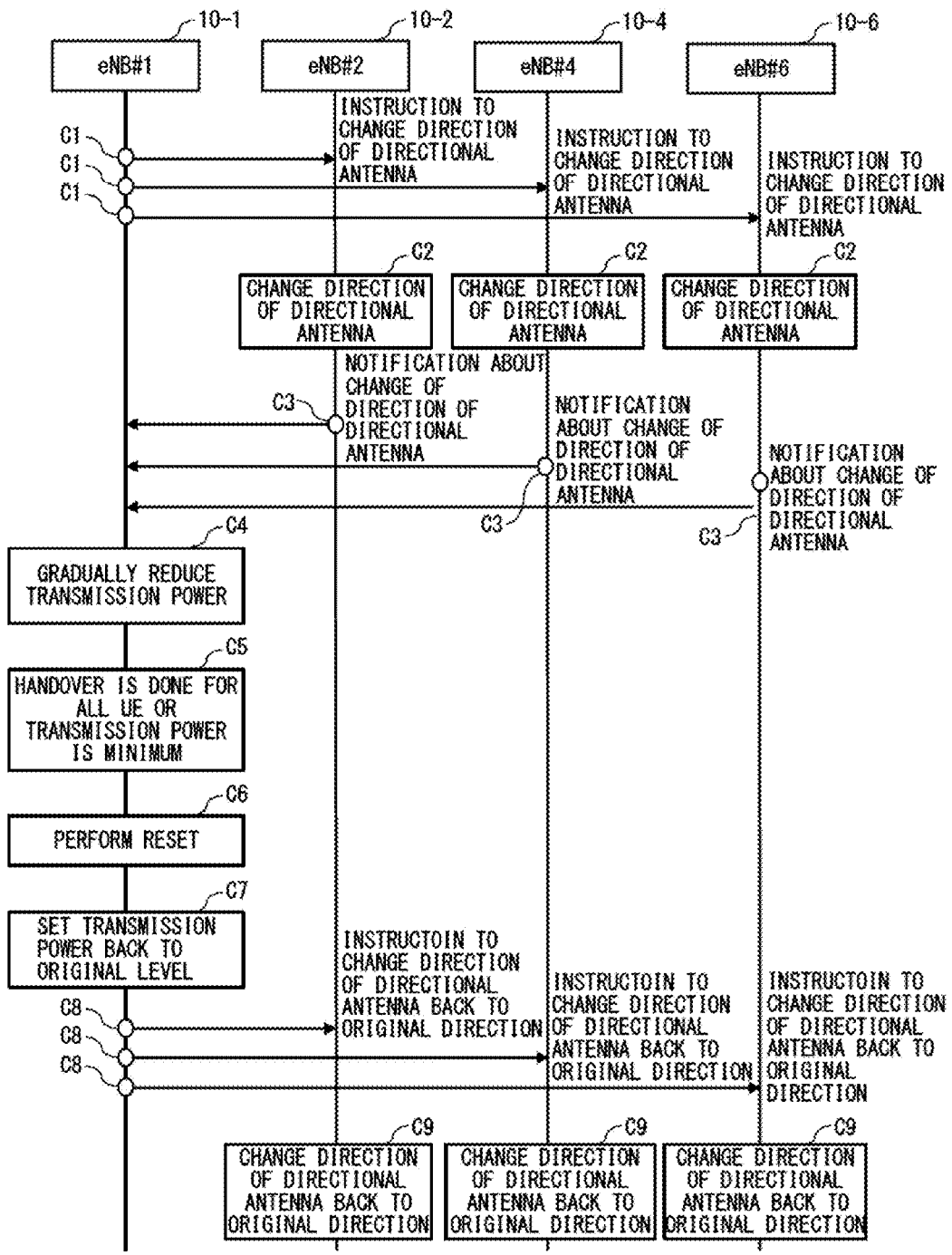
FIG. 10 is a sequence chart showing an operation example of the wireless communication system according to the fifth exemplary embodiment.

Hereinafter, the operation in the case where the eNB (#1) 10-1 narrows the cell range (or reduces the transmission power) for carrying out a reset in the wireless communication system according to this exemplary embodiment is described with reference to FIG. 10. It is assumed in this example that the cell arrangement of the eNBs (#1-#7) 10-1 to 10-7 before the eNB (#1) 10-1 narrows the cell range (or reduces the transmission power) is the cell arrangement shown in FIG. 1.

In the case where the eNB (#1) 10-1 narrows the cell range (or reduces the transmission power) for carrying out a reset, the control unit 103 of the eNB (#1) 10-1 transmits an instruction signal that contains position information of the eNB (#1) 10-1 and gives an instruction to change the direction of the directional antenna 101 in the direction of the eNB (#1) 10-1 to the eNBs (#2,#4,#6) 10-2, 10-4 and 10-6 which are adjacent to the eNB (#1) 10-1 through the communication IF unit 104 (Step C1). Note that, although the destination of the instruction signal in Step C1 is the adjacent three eNBs (#2,#4,#6) 10-2, 10-4 and 10-6 in this exemplary embodiment, it is not necessarily three eNBs, and it may be one eNB or all of the adjacent eNBs (#2-#7) 10-2 to 10-7. When selecting an arbitrary number or a specified number of (e.g., one or three) eNBs as the destination, the number of times each of the adjacent eNBs (#2-#7) 10-2 to 10-7 serves as the destination of a handover from the eNB (#1) 10-1 may be stored, and an arbitrary number or a specified number of eNBs may be selected sequentially in descending order of that number. Further, the instruction signal in Step C1 may be contained in an X2 setup Request message, a HO Request message or an eNB Reconfiguration Update message and transmitted, or may be contained in a new message and transmitted.

Figure 11:
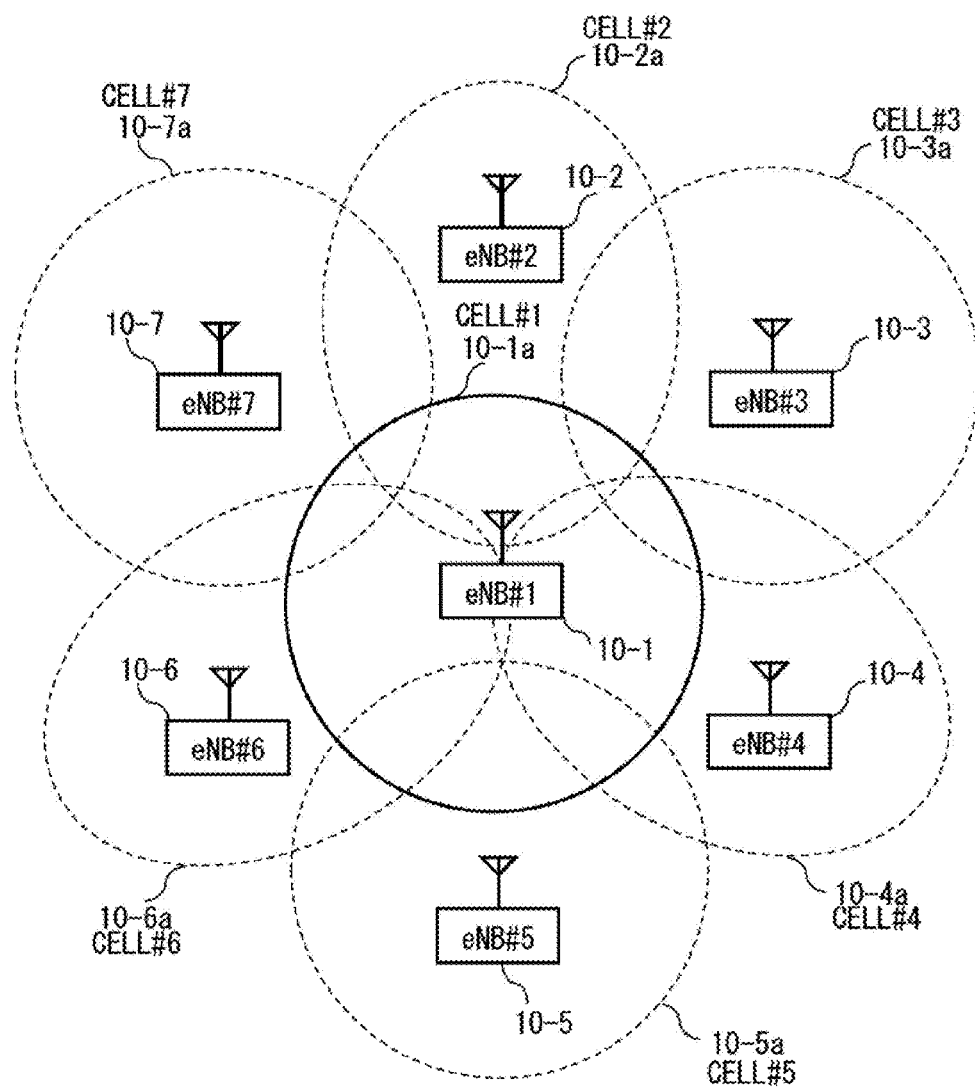
FIG. 11 is a view showing an example of cell arrangement changed by the wireless communication system according to the fifth and sixth exemplary embodiments.

In the eNBs (#2,#4,#6) 10-2, 10-4 and 10-6, the control unit 103 receives the instruction signal from the eNB (#1) 10-1 that gives an instruction to change the direction of the directional antenna 101 in the direction of the eNB (#1) 10-1 through the communication IF unit 104. In the eNBs (#2, #4,#6) 10-2, 10-4 and 10-6, the control unit 103 that has received the instruction signal controls the wireless unit 102 and changes the direction of the directional antenna 101 in the direction of the eNB (#1) 10-1 (Step C2). By this operation, the cell shapes of the eNBs (#2,#4,#6) 10-2, 10-4 and 10-6 change into oval, and the cell ranges expand in the direction of the eNB (#1) 10-1 and completely overlap the cell range of the eNB (#1) 10-1 as shown in FIG. 11. Note that, in this exemplary embodiment, it is just an example that the cell ranges of the eNBs (#2,#4,#6) 10-2, 10-4 and 10-6 completely overlap the cell of the eNB (#1) 10-1, and the cell ranges may only partially overlap it. Next, the control unit 103 of the eNBs (#2,#4,#6) 10-2, 10-4 and 10-6 transmits, to the eNB (#1) 10-1, a notification signal that gives a notification that the direction of the directional antenna 101 has changed in the direction of the eNB (#1) 10-1 through the communication IF unit 104 (Step C3). Note that, in this exemplary embodiment, the notification signal in Step C3 may be contained in an X2 setup Response message, a HO Request Acknowledge message or an eNB Configuration Update Acknowledge message and transmitted, or may be contained in a new message and transmitted.

In the eNB (#1) 10-1, the control unit 103 receives the notification signal that gives a notification that the direction of the directional antenna 101 has changed in the direction of the eNB (#1) 10-1 from the eNBs (#2,#4,#6) 10-2, 10-4 and 10-6 through the communication IF unit 104. In the eNB (#1) 10-1, the control unit 103 that has received the notification signal controls the wireless unit 102 and gradually reduces the transmission power of a radio signal that is transmitted from the antenna 101 (Step C4). In the eNB (#1) 10-1, when all of the UEs 12 that have made a call connection are handed over to any one of the other eNBs (#2,#4,#6) 10-2, 10-4 and 10-6, or when the transmission power decreases to the minimum value (Step C5), the control unit 103 carries out a reset (Step C6). Note that, in this exemplary embodiment, it is just an example that all of the UEs 12 that have made a call connection are handed over, and Step C6 may be performed when only some of the UEs 12 are handed over. When a reset is completed (if it is a reset for software update, when software update after a reset is completed), the control unit 103 in the eNB (#1) 10-1 controls the wireless unit 102 and sets the transmission power of a radio signal that is transmitted from the antenna 101 back to the original level (Step C7). Then, the control unit 103 in the eNB (#1) 10-1 transmits an instruction signal that gives an instruction to change the direction of the directional antenna 101 back to the original direction to the eNBs (#2,#4,#6) 10-2, 10-4 and 10-6 through the communication IF unit 104 (Step C8). Note that, in this exemplary embodiment, the instruction signal in Step C8 may be contained in the same messages as those used for the instruction signal in Step C1 and transmitted.

In the eNBs (#2,#4,#6) 10-2, 10-4 and 10-6, the control unit 103 receives the instruction signal that gives an instruction to change the direction of the directional antenna 101 back to the original direction from the eNB (#1) 10-1 through the communication IF unit 104. In the eNBs (#2, #4,#6) 10-2, 10-4 and 10-6, the control unit 103 that has received the instruction signal controls the wireless unit 102 and changes the direction of the directional antenna 101 back to the original direction (Step C9). By this operation, the cell shapes of the eNBs (#2,#4,#6) 10-2, 10-4 and 10-6 are changed back to the original circular shapes, and it returns to the state where there are a part (shaded area) that overlaps the cell range of the eNB (#1) 10-1 and a part (blank area) that does not overlap it as shown in FIG. 1.

As described above, in this exemplary embodiment, the eNB (#1) 10-1 transmits an instruction signal that gives an instruction to change the direction of the directional antenna 101 in the direction of the eNB (#1) 10-1 to the eNBs (#2,#4,#6) 10-2, 10-4 and 10-6 which are adjacent to the eNB (#1) 10-1 before narrowing the cell range (or reducing the transmission power). It is thereby possible to increase the area where the cell of the eNB (#1) 10-1 and the cells of the eNBs (#2,#4,#6) 10-2, 10-4 and 10-6 overlap before the eNB (#1) 10-1 narrows the cell range (or reduces the transmission power). The other effects are the same as those of the third embodiment.

Note that, in this exemplary embodiment, the eNB (#1) 10-1 may use, as the position information of the eNB (#1) 10-1 to be contained in the instruction signal in Step C1, latitude and longitude information that is registered in advance or latitude and longitude information that is measured using a GPS (Global Positioning System) system or the like. Further, the eNB (#1) 10-1 may use ID (identity) of the eNB (#1) 10-1 as the position information of the eNB (#1) 10-1 to be contained in the instruction signal in Step C1.

Note that, in this exemplary embodiment, all of the eNBs (#2,#4,#6) 10-2, 10-4 and 10-6 that have received an instruction from the eNB (#1) 10-1 change the direction of the directional antenna 101 in Steps C3 and C4. However, the eNBs (#2,#4,#6) 10-2, 10-4 and 10-6 may reject an instruction from the eNB (#1) 10-1 when the direction of the directional antenna 101 is already in the direction of the eNB (#1) or the like. When rejecting an instruction, a notification signal that notifies rejection is transmitted in Step C3. The notification signal in this case may be contained in an X2 setup Failure message or an eNB Configuration Update Failure message and transmitted, or may be contained as an information element related to rejection in a HO Request Acknowledge message and transmitted.

Further, in this exemplary embodiment, there is a case where the eNB (#1) 10-1 receives the above-described rejection in Step C3. Thus, it may have the following configuration. The eNB (#1) 10-1 starts up a timer at the time when it transmits the instruction signal in Step C1. Then, when the eNB (#1) 10-1 receives a notification signal that gives a notification that the direction of the directional antenna 101 has changed in the direction of the eNB (#1) 10-1 from at least one of the eNBs (#2,#4,#6) 10-2, 10-4 and 10-6 within an arbitrary time or a specified time, the process proceeds to Step C4, and otherwise, the process returns to Step C1 and transmits an instruction signal to another adjacent eNB.

Further, in this exemplary embodiment, the eNB (#1) 10-1 may have the following configuration in order not to receive the above-described rejection. The eNB (#1) 10-1 acquires and stores the current direction of the directional antennas 101 of the eNBs (#2-#7) 10-2 to 10-7. Then, when selecting an arbitrary number or a specified number of (e.g., one or three) eNBs as the destination of the instruction signal in Step C1, the eNB (#1) 10-1 selects an arbitrary number or a specified number of eNBs sequentially in descending order of angular difference between the current direction of the directional antennas 101 and the direction of the eNB (#1) 10-1.

Further, in this exemplary embodiment, the eNB (#1) 10-1 may indicate the timing to change the direction of the directional antenna 101 (a specific time, or after the lapse of an arbitrary time or a specified time etc.) by the instruction signal in Step C1.

(6) Sixth Exemplary Embodiment

This exemplary embodiment is an example in which the wireless communication system according to the second exemplary embodiment is applied to an LTE wireless communication system, just like the fourth exemplary embodiment.

Note that, however, the transmission power of eNBs that are adjacent to the eNB (#1) 10-1 is increased in the fourth exemplary embodiment. On the other hand, in this exemplary embodiment, the direction of the directional antennas of eNBs that are adjacent to the eNB (#1) 10-1 is changed in the direction of the eNB (#1) 10-1. Thus, in this exemplary embodiment, the antennas 101 of the eNBs (#1-#7) 10-1 to 10-7 are directional antennas (in the following description of this exemplary embodiment, the antenna 101 is referred to as the directional antenna 101). The other configuration in this exemplary embodiment is the same as the configuration in the fourth exemplary embodiment.

Figure 12:
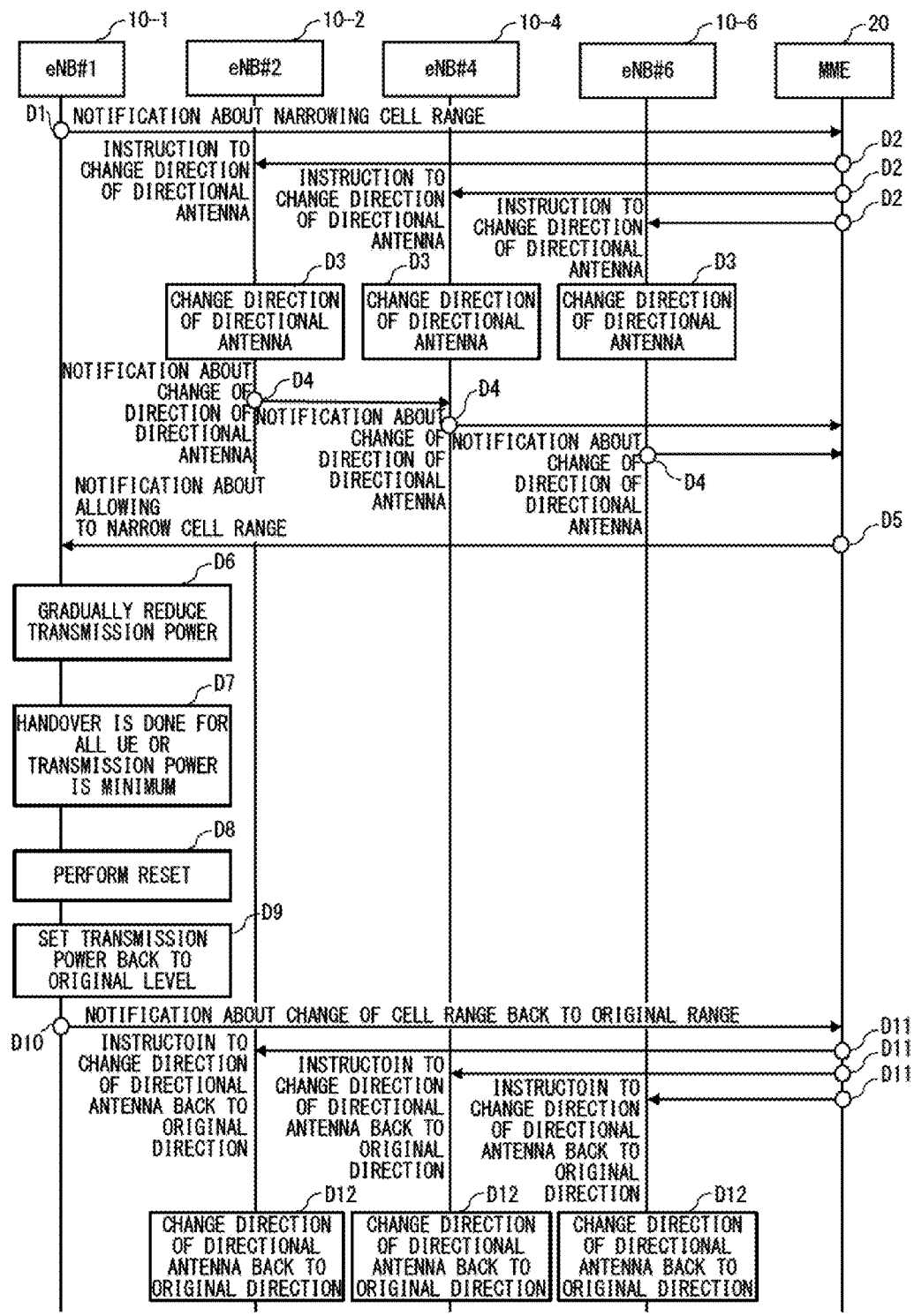
FIG. 12 is a sequence chart showing an operation example of the wireless communication system according to the sixth exemplary embodiment.

Hereinafter, the operation in the case where the eNB (#1) 10-1 narrows the cell range (or reduces the transmission power) for carrying out a reset in the wireless communication system according to this exemplary embodiment is described with reference to FIG. 12. It is assumed in this example that the cell arrangement of the eNBs (#1-#7) 10-1 to 10-7 before the eNB (#1) 10-1 narrows the cell range (or reduces the transmission power) is the cell arrangement shown in FIG. 1.

In the case where the eNB (#1) 10-1 narrows the cell range (or reduces the transmission power) for carrying out a reset, the control unit 103 of the eNB (#1) 10-1 transmits a notification signal that gives a notification of narrowing the cell range (or reducing the transmission power) to the MME 20 through the communication IF unit 104 (Step D1). Note that, in this embodiment, the notification signal in Step D1 may be contained in an MME Configuration Update message, an MME Direct Information Transfer message, or an MME Configuration Transfer message and transmitted, or may be contained in a new message and transmitted.

In the MME 20, the control unit 201 receives the notification signal that gives a notification of narrowing the cell range (or reducing the transmission power) from the eNB (#1) 10-1 through the communication IF unit 202. In the MME 20, the control unit 201 that has received the notification signal transmits an instruction signal that contains position information of the eNB (#1) 10-1 and gives an instruction to change the direction of the directional antenna 101 in the direction of the eNB (#1) 10-1 to the eNBs (#2,#4,#6) 10-2, 10-4 and 10-6 which are adjacent to the eNB (#1) 10-1 (Step D2). Note that, although the destination of the instruction signal in Step D2 is the three eNBs (#2,#4,#6) 10-2, 10-4 and 10-6 which are adjacent to the eNB (#1) 10-1 in this exemplary embodiment, it is not necessarily three eNBs, and it may be one eNB or all of the adjacent eNBs (#2-#7) 10-2 to 10-7. When selecting an arbitrary number or a specified number of (e.g., one or three) eNBs as the destination, the number of times each of the eNBs (#2-#7) 10-2 to 10-7 which are adjacent to the eNB (#1) 10-1 serves as the destination of a handover from the eNB (#1) 10-1 may be stored, and an arbitrary number or a specified number of eNBs may be selected sequentially in descending order of that number. Further, the instruction signal in Step D2 may be contained in an eNB Configuration Update message, an eNB Direct Information Transfer message or an eNB Configuration Transfer message and transmitted, or may be contained in a new message and transmitted.

In the eNBs (#2,#4,#6) 10-2, 10-4 and 10-6, the control unit 103 receives the instruction signal from the MME 20 that gives an instruction to change the direction of the directional antenna 101 in the direction of the eNB (#1) 10-1 through the communication IF unit 104. In the eNBs (#2,#4,#6) 10-2, 10-4 and 10-6, the control unit 103 that has received the instruction signal controls the wireless unit 102 and changes the direction of the directional antenna 101 in the direction of the eNB (#1) 10-1 (Step D3). By this operation, the cell shapes of the eNBs (#2,#4,#6) 10-2, 10-4 and 10-6 change into oval, and the cell ranges expand in the direction of the eNB (#1) 10-1 and completely overlap the cell range of the eNB (#1) 10-1 as shown in FIG. 11. Note that, in this exemplary embodiment, it is just an example that the cell ranges of the eNBs (#2,#4,#6) 10-2, 10-4 and 10-6 completely overlap the cell of the eNB (#1) 10-1, and the cell ranges may only partially overlap it. Next, the control unit 103 of the eNBs (#2,#4,#6) 10-2, 10-4 and 10-6 transmits, to the MME 20, a notification signal that gives a notification that the direction of the directional antenna 101 has changed in the direction of the eNB (#1) 10-1 through the communication IF unit 104 (Step D4). Note that, in this exemplary embodiment, the notification signal in Step D4 may be contained in the same messages as those used for the notification signal case of the notification signal in Step D1 and transmitted.

In the MME 20, the control unit 201 receives the notification signal that gives a notification that the direction of the directional antenna 101 has changed in the direction of the eNB (#1) 10-1 from the eNBs (#2,#4,#6) 10-2, 10-4 and 10-6 through the communication IF unit 202. In the MME 20, the control unit 201 that has received the notification signal gives a notification signal that gives a notification of allowing to narrow the cell range (or reduce the transmission power) to the eNB (#1) 10-1 through the communication IF unit 104 (Step D5). Note that, in this exemplary embodiment, the notification signal in Step D5 may be contained in the same messages as those used for the instruction signal in Step D2 and transmitted.

In the eNB (#1) 10-1, the control unit 103 receives the notification signal that gives a notification of allowing to narrow the cell range (or reduce the transmission power) from the MME 20 through the communication IF unit 104. In the eNB (#1) 10-1, the control unit 103 that has received the notification signal controls the wireless unit 102 and gradually reduces the transmission power of a radio signal that is transmitted from the antenna 101 (Step D6). In the eNB (#1) 10-1, when all of the UEs 12 that have made a call connection are handed over to any one of the other eNBs (#2,#4,#6) 10-2, 10-4 and 10-6, or when the transmission power decreases to the minimum value (Step D7), the control unit 103 carries out a reset (Step D8). Note that, in this exemplary embodiment, it is just an example that all of the UEs 12 that have made a call connection are handed over, and Step D8 may be performed when only some of the UEs 12 are handed over. When a reset is completed (if it is a reset for software update, when software update after a reset is completed), the control unit 103 in the eNB (#1) 10-1 controls the wireless unit 102 and sets the transmission power of a radio signal that is transmitted from the antenna 101 back to the original level (Step D9). Then, the control unit 103 in the eNB (#1) 10-1 transmits a notification signal that gives a notification that the cell range has returned to the original range (or the transmission power has returned to the original level) to the MME 20 through the communication IF unit 104 (Step D10). Note that, in this exemplary embodiment, the notification signal in Step D10 may be contained in the same messages as those used for the notification signal case of the notification signal in Step D1 and transmitted.

In the MME 20, the control unit 201 receives the notification signal that gives a notification that the cell range has returned to the original range (or the transmission power has returned to the original level) from the eNB (#1) 10-1 through the communication IF unit 202. In the MME 20, the control unit 201 that has received the notification signal transmits an instruction signal that gives an instruction to change the direction of the directional antenna 101 back to the original direction to the eNBs (#2,#4,#6) 10-2, 10-4 and 10-6 (Step D11). Note that, in this exemplary embodiment, the instruction signal in Step D11 may be contained in the same messages as those used for the instruction signal in Step D2 and transmitted.

In the eNBs (#2,#4,#6) 10-2, 10-4 and 10-6, the control unit 103 receives the instruction signal from the MME 20 that gives an instruction to change the direction of the directional antenna 101 back to the original direction through the communication IF unit 104. In the eNBs (#2, #4,#6) 10-2, 10-4 and 10-6, the control unit 103 that has received the instruction signal controls the wireless unit 102 and changes the direction of the directional antenna 101 back to the original direction (Step C12). By this operation, the cell shapes of the eNBs (#2,#4,#6) 10-2, 10-4 and 10-6 are changed back to the original circular shapes, and it returns to the state where there are a part (shaded area) that overlaps the cell range of the eNB (#1) 10-1 and a part (blank area) that does not overlap it as shown in FIG. 1.

As described above, in this exemplary embodiment, the MME 20 transmits an instruction signal that gives an instruction to change the direction of the directional antenna 101 in the direction of the eNB (#1) 10-1 to the eNBs (#2,#4,#6) 10-2, 10-4 and 10-6 which are adjacent to the eNB (#1) 10-1 before the eNB (#1) 10-1 narrows the cell range (or reduces the transmission power). It is thereby possible to increase the area where the cell of the eNB (#1) 10-1 and the cells of the eNBs (#2,#4,#6) 10-2, 10-4 and 10-6 overlap before the eNB (#1) 10-1 narrows the cell range (or reduces the transmission power). The other effects are the same as those of the third embodiment.

Note that, in this exemplary embodiment, the MME 20 may use, as the position information of the eNB (#1) 10-1 to be contained in the instruction signal in Step D2, latitude and longitude information that is registered in advance or latitude and longitude information that is measured using GPS or the like, just like in the fifth embodiment. Further, the MME 20 may use ID of the eNB (#1) 10-1 as the position information of the eNB (#1) 10-1 to be contained in the instruction signal in Step D2.

Note that, in this exemplary embodiment, just like in the fifth exemplary embodiment, the eNBs (#2,#4,#6) 10-2, 10-4 and 10-6 may reject an instruction to change the direction of the directional antenna 101 from the MME 20 in Step D2.

Further, in this exemplary embodiment, just like in the fifth exemplary embodiment, the MME 20 may have the following configuration in order not to receive the above-described rejection. The MME 20 acquires and stores the current direction of the directional antennas 101 of the eNBs (#2-#7) 10-2 to 10-7. Then, when selecting an arbitrary number or a specified number of (e.g., one or three) eNBs as the destination of the instruction signal in Step D2, the MME 20 selects, from the eNBs (#2-#7) 10-2 to 10-7, an arbitrary number or a specified number of eNBs sequentially in descending order of angular difference between the current direction of the directional antennas 101 and the direction of the eNB (#1) 10-1.

Further, in this exemplary embodiment, because there is a case where the MME 20 receives the above-described rejection, it may have the following configuration, just like in the fifth exemplary embodiment. The MME 20 starts up a timer at the time when it transmits the instruction signal in Step D2. Then, when the MME 20 receives a notification signal that gives a notification that the direction of the directional antenna 101 has changed in the direction of the eNB (#1) 10-1 from at least one of the eNBs (#2,#4,#6) 10-2, 10-4 and 10-6 within an arbitrary time or a specified time, the process proceeds to Step D5, and otherwise, the process returns to Step D2 and transmits an instruction signal to another adjacent eNB.

Further, in this exemplary embodiment, the MME 20 may indicate the timing to change the direction of the directional antenna 101 (a specific time, or after the lapse of an arbitrary time or a specified time etc.) by the instruction signal in Step D2, just like in the fifth exemplary embodiment.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

For example, an instruction signal that instructs the second wireless base station to expand the cell range in the direction of the first wireless base station is directly transmitted from the first wireless base station to the second wireless base station in the exemplary embodiments described above. Alternatively, the above-described instruction signal is transmitted from the core network device to the second wireless base station. However, it is not limited thereto, and the above-described instruction signal may be transmitted from a wireless terminal to the second wireless base station. In this case, the first wireless base station may transmit the above-described instruction signal to the wireless terminal, and the wireless terminal may transfer the signal to the second wireless base station. Alternatively, the first wireless base station may transmit a notification signal that gives a notification of narrowing the cell range (or reducing the transmission power) to a wireless terminal, and the wireless terminal that has received this signal may transmit the above-described instruction signal to the second wireless base station. Further, the above-described instruction signal may be transmitted from an O & M (Operation & Maintenance) server to the second wireless base station. In this case, the first wireless base station may transmit a notification signal that gives a notification of narrowing the cell range (or reducing the transmission power) to an O & M server, and the O & M server that has received this signal may transmit the above-described instruction signal to the second wireless base station.

Further, in the exemplary embodiments described above, an instruction signal that instructs the second wireless base station to expand the cell range in the direction of the first wireless base station is transmitted to the second wireless base station before narrowing the cell range (or reducing the transmission power) for carrying out a reset of the first wireless base station. However, the above-described instruction signal may be transmitted at another timing for another purpose. For example, the above-described instruction signal may be transmitted to the second wireless base station before narrowing the cell range (or reducing the transmission power) for forcibly making a handover of a wireless terminal in the cell of the first wireless base station to the second wireless base station.

This application is based upon and claims the benefit of priority from Japanese patent application No. 2015-040244 filed on Mar. 2, 2015, the disclosure of which is incorporated herein in its entirety by reference.

REFERENCE SIGNS LIST

1-1,1-2 WIRELESS BASE STATION
1A COMMUNICATION UNIT
1B CONTROL UNIT
2 CORE NETWORK DEVICE
2A COMMUNICATION UNIT
2B CONTROL UNIT
10-1 to 10-7 eNB
101 ANTENNA
102 WIRELESS UNIT
103 CONTROL UNIT
104 COMMUNICATION IF UNIT
11 X2 LINK
110 E-UTRAN
20 MME
201 CONTROL UNIT
202 COMMUNICATION IF UNIT
21 S-GW
22 P-GW
23 S1 LINK
210 EPC

What is claimed is:

1. A wireless base station comprising:
   a communication unit; and
   a control unit that transmits, to an adjacent wireless base station adjacent to the wireless base station, through the communication unit, an instruction signal that gives an instruction to expand a cell range of the adjacent wireless base station in a direction of the wireless base station before the wireless base station narrows a cell range or reduces transmission power, wherein the control unit narrows the cell range or reduces the transmission power of the wireless base station after receiving, from the adjacent wireless base station, a notification signal that gives a notification that the adjacent wireless base station has expanded the cell range of the adjacent wireless base station in the direction of the wireless base station.

2. The wireless base station according to claim 1, wherein the control unit gives an instruction, in the instruction signal, to increase transmission power of the adjacent wireless base station.

3. The wireless base station according to claim 2, wherein the control unit gives an instruction, in the instruction signal, to increase transmission power of the adjacent wireless base station to a maximum transmission power value.

4. The wireless base station according to claim 2, wherein the control unit stores a transmission power value of the adjacent wireless base station required for a cell of the adjacent wireless base station to overlap a cell of the wireless base station, and gives an instruction, in the instruction signal, to increase transmission power of the adjacent wireless base station to the stored transmission power value.

5. The wireless base station according to claim 2, wherein the control unit gives an instruction, in the instruction signal, to gradually increase transmission power of the adjacent wireless base station, measures reception power of a radio signal received from the adjacent wireless base station, and when the measured reception power exceeds a threshold, transmits, to the adjacent wireless base station, through the communication unit, a stop instruction signal that gives an instruction to stop increasing transmission power of the adjacent wireless base station.

6. The wireless base station according to claim 2, wherein there are a plurality of adjacent wireless base stations, and the control unit acquires and stores a current transmission power value of each of the plurality of adjacent wireless base stations, selects an arbitrary number or a specified number of adjacent wireless base stations in an ascending order of the current transmission power value from the plurality of adjacent wireless base stations, and transmits the instruction signal to the selected adjacent wireless base stations.

7. The wireless base station according to claim 2, wherein there are a plurality of adjacent wireless base stations, and the control unit acquires and stores a maximum transmission power value and a current transmission power value of each of the plurality of adjacent wireless base stations, selects an arbitrary number or a specified number of adjacent wireless base stations in a descending order of difference between the maximum transmission power value and the current transmission power value from the plurality of adjacent wireless base stations, and transmits the instruction signal to the selected adjacent wireless base stations.

8. The wireless base station according to claim 2, wherein there are a plurality of adjacent wireless base stations, and the control unit stores, for each of the plurality of adjacent wireless base stations, the number of times the adjacent wireless base station serves as a destination of a handover from the wireless base station, selects an arbitrary number or a specified number of adjacent wireless base stations in a descending order of the stored number from the plurality of adjacent wireless base stations, and transmits the instruction signal to the selected adjacent wireless base stations.

9. The wireless base station according to claim 1, wherein the control unit adds position information of the wireless base station to the instruction signal, and gives an instruction, in the instruction signal, to change a direction of a directional antenna of the adjacent wireless base station in a direction of the wireless base station.

10. The wireless base station according to claim 9, wherein there are a plurality of adjacent wireless base stations, and
the control unit acquires and stores a current direction of a directional antenna of each of the plurality of adjacent wireless base stations, selects an arbitrary number or a specified number of adjacent wireless base stations in a descending order of angular difference between the current direction of the directional antenna and the direction of the wireless base station from the plurality of adjacent wireless base stations, and transmits the instruction signal to the selected adjacent wireless base stations.

11. The wireless base station according to claim 1, wherein the wireless base station and the adjacent wireless base station constitute an LTE (Long Term Evolution) wireless communication system, and
the control unit transmits the instruction signal by use of an X2 setup Request message, a HO (Handover) Request message, or an eNB (evolved NodeB) Reconfiguration Update message.

12. A core network device comprising:

a communication unit that receives, from a first wireless base station, a notification signal that gives a notification that the first wireless base station is to narrow a cell range or reduce transmission power; and a control unit that, when the notification signal is received from the first wireless base station, transmits, to a second wireless base station adjacent to the first wireless base station, through the communication unit, an instruction signal that gives an instruction to expand a cell range of the second wireless base station in a direction of the first wireless base station, wherein the control unit transmits, to the first wireless base station, a notification signal that gives a notification of allowing to narrow the cell range or reduce the transmission power after receiving, from the second wireless base station, a notification signal that gives a notification that the second wireless base station has expanded the cell range of the second wireless base station in the direction of the first wireless base station.

13. The core network device according to claim 12, wherein the control unit gives an instruction, in the instruction signal, to increase transmission power of the second wireless base station.

14. The core network device according to claim 13, wherein the control unit gives an instruction, in the instruction signal, to increase transmission power of the second wireless base station to a maximum transmission power value.

15. The core network device according to claim 13, wherein the control unit stores a transmission power value of the second wireless base station required for a cell of the second wireless base station to overlap a cell of the first wireless base station, and gives an instruction, in the instruction signal, to increase transmission power of the second wireless base station to the stored transmission power value.

16. The core network device according to claim 13, wherein the control unit gives an instruction, in the instruction signal, to gradually increase transmission power of the second wireless base station, and when reception power of a radio signal from the second wireless base station received and measured by the first wireless base station exceeds a threshold, transmits, to the second wireless base station, through the communication unit, a stop instruction signal that gives an instruction to stop increasing transmission power of the second wireless base station.

17. The core network device according to claim 13, wherein
there are a plurality of second wireless base stations, and
the control unit acquires and stores a current transmission power value of each of the plurality of second wireless base stations, selects an arbitrary number or a specified number of second wireless base stations in ascending order of the current transmission power value from the plurality of second wireless base stations, and transmits the instruction signal to the selected second wireless base stations.

18. The core network device according to claim 13, wherein
there are a plurality of second wireless base stations, and
the control unit acquires and stores a maximum transmission power value and a current transmission power value of each of the plurality of second wireless base stations, selects an arbitrary number or a specified number of second wireless base stations in descending order of difference between the maximum transmission power value and the current transmission power value from the plurality of second wireless base stations, and transmits the instruction signal to the selected second wireless base stations.

19. The core network device according to claim 12, wherein the control unit adds position information of the first wireless base station to the instruction signal, and gives an instruction, in the instruction signal, to change a direction of a directional antenna of the second wireless base station in a direction of the first wireless base station.

20. A wireless communication method by a wireless base station, comprising:
transmitting, to an adjacent wireless base station adjacent to the wireless base station, an instruction signal that gives an instruction to expand a cell range of the adjacent wireless base station in a direction of the wireless base station before the wireless base station narrows a cell range or reduces a transmission power;
receiving, from the adjacent wireless base station, a notification signal that gives a notification that the adjacent wireless base station has expanded the cell range of the adjacent wireless base station in the direction of the wireless base station; and
narrowing, after the receiving, the cell range or reducing the transmission power of the wireless base station.

* * * * *

UNITED STATES PATENT AND TRADEMARK OFFICE
CERTIFICATE OF CORRECTION

PATENT NO. : 10,194,323 B2
APPLICATION NO. : 15/551088
DATED : January 29, 2019
INVENTOR(S) : Tomoki Furuya It is certified that error appears in the above-identified patent and that said Letters Patent is hereby corrected as shown below:

In the Specification

Column 16, Description of Embodiments, Line 67; Delete "Dn." and insert --D1).-- therefor Signed and Sealed this
Eighteenth Day of June, 2019

Andrei Iancu
*Director of the United States Patent and Trademark Office*